United States Patent
Kobayashi et al.

(10) Patent No.: US 7,557,882 B2
(45) Date of Patent: Jul. 7, 2009

(54) LIQUID CRYSTAL DISPLAY

(75) Inventors: Kentarou Kobayashi, Ibaraki (JP); Masaki Hayashi, Ibaraki (JP); Shuuji Yano, Ibaraki (JP)

(73) Assignee: Nitto Denko Corporation, Osaka (JP)

(*) Notice: Subject to any disclaimer, the term of this patent is extended or adjusted under 35 U.S.C. 154(b) by 258 days.

(21) Appl. No.: 11/603,234

(22) Filed: Nov. 22, 2006

(65) Prior Publication Data
US 2007/0211199 A1  Sep. 13, 2007

(30) Foreign Application Priority Data
Nov. 25, 2005  (JP) ............ P.2005-340663

(51) Int. Cl.
*G02F 1/1335* (2006.01)

(52) U.S. Cl. ............ 349/118; 349/61; 349/62; 349/70; 349/117

(58) Field of Classification Search ......... 349/117–119, 349/61–62, 70
See application file for complete search history.

(56) References Cited

U.S. PATENT DOCUMENTS

| | | | |
|---|---|---|---|
| 5,523,863 | A | 6/1996 | Fergason |
| 6,049,428 | A | 4/2000 | Khan et al. |
| 2006/0050198 | A1* | 3/2006 | Kirita et al. ............ 349/61 |
| 2007/0076150 | A1* | 4/2007 | Hale et al. ............ 349/117 |

FOREIGN PATENT DOCUMENTS

| | | | |
|---|---|---|---|
| JP | 61-292601 | A | 12/1986 |
| JP | 05-027119 | A | 2/1993 |
| JP | 11-116780 | A | 4/1999 |
| JP | 11-305217 | | * 11/1999 |
| JP | 11-305217 | A | 11/1999 |
| JP | 2000-315144 | A | 11/2000 |
| JP | 2001-188128 | A | 7/2001 |
| JP | 2001-350017 | A | 12/2001 |
| JP | 2002-031812 | A | 1/2002 |
| JP | 2005-008698 | A | 1/2005 |

* cited by examiner

*Primary Examiner*—Frank G Font
*Assistant Examiner*—Michael P Mooney
(74) *Attorney, Agent, or Firm*—Westerman, Hattori, Daniels & Adrian, LLP.

(57) ABSTRACT

The present invention provides a liquid crystal display including: a liquid crystal panel; and a lighting device disposed on one side of the liquid crystal panel, the liquid crystal panel including: a liquid crystal cell; a first polarizer disposed on one side of the liquid crystal cell; a second polarizer disposed on the other side of the liquid crystal cell; and a first optical element disposed between the liquid crystal cell and the first polarizer; the absorption axis direction of the first polarizer being substantially perpendicular to the absorption axis direction of the second polarizer, the first optical element having an optical indicatrix having a relationship of $nx \geq nz > ny$, the lighting device having: a maximum value of luminance in the wavelength range of $550 \pm 50$ nm; and a relative luminance at a wavelength of 450 nm is 0.28 or less.

17 Claims, 11 Drawing Sheets

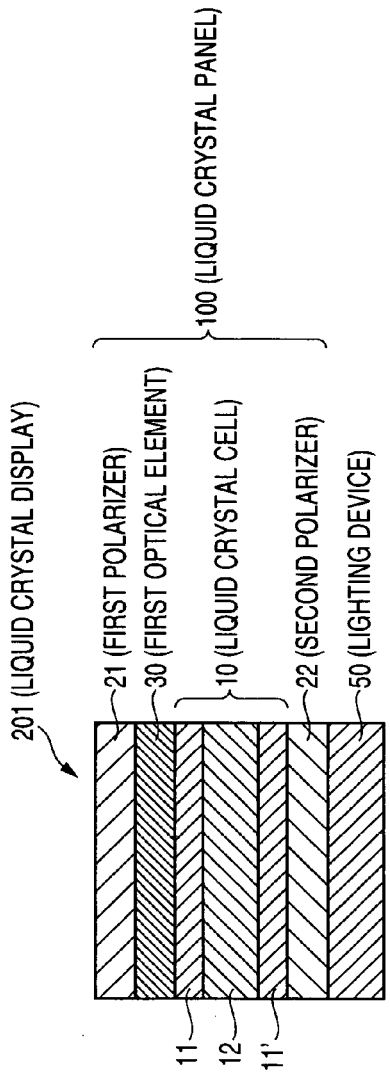
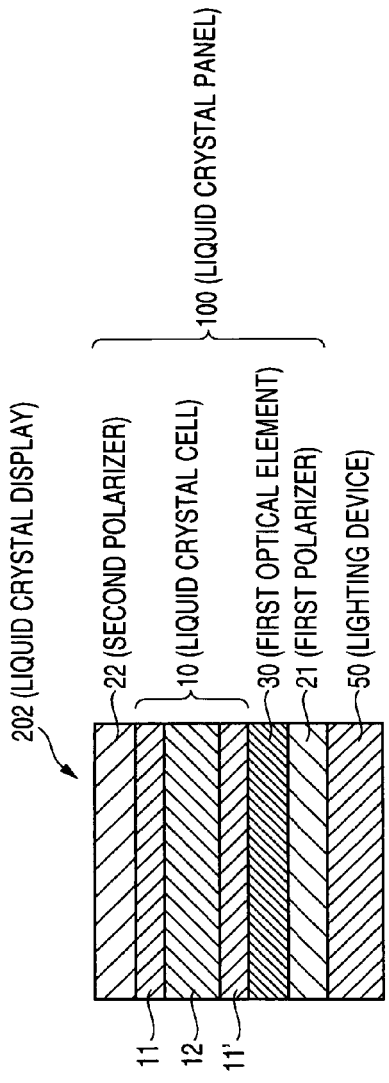
FIG. 1A
FIG. 1B

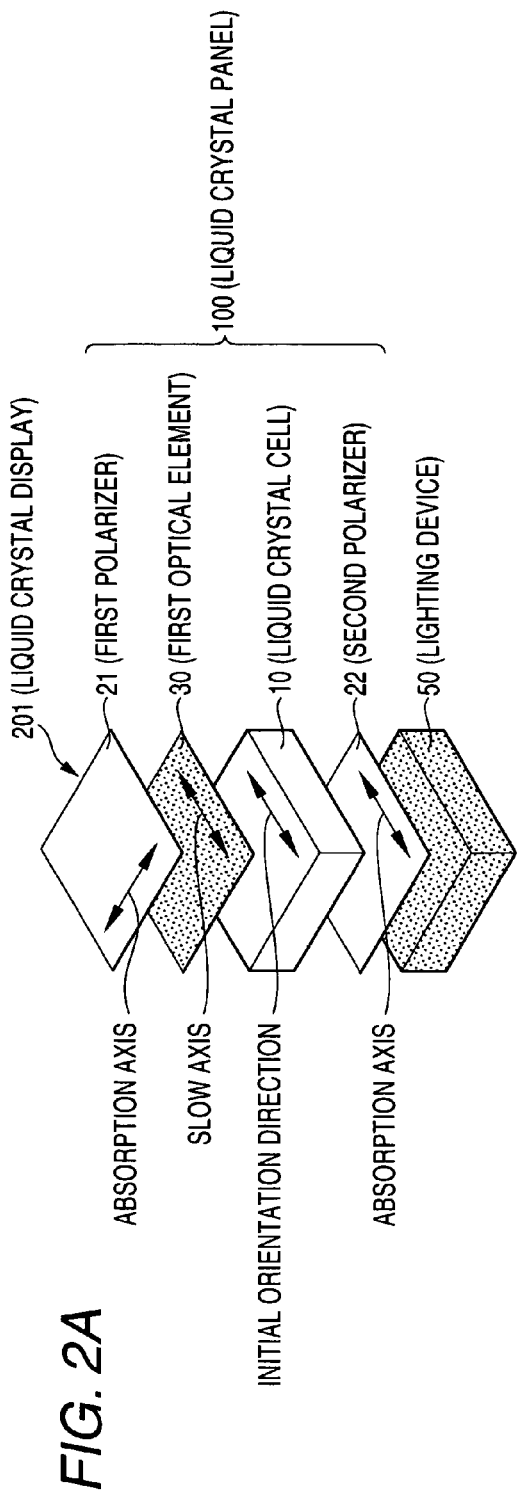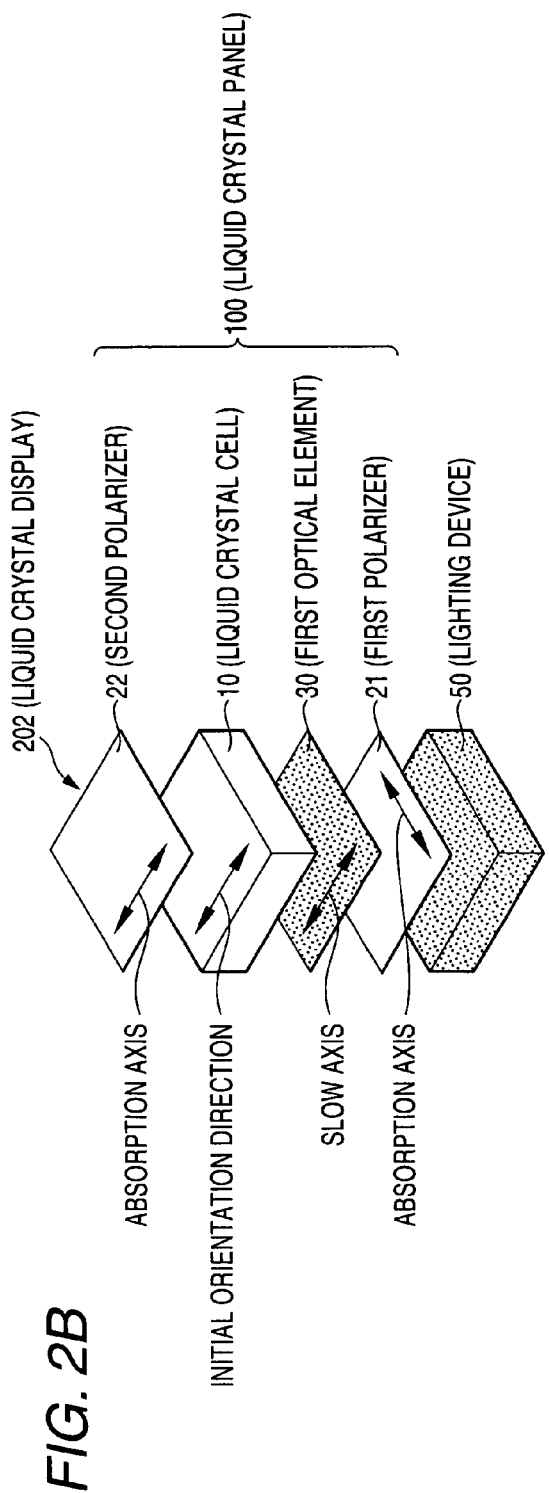

50 (LIGHTING DEVICE)
55 (BRIGHTNESS ENHANCEMENT FILM)
54 (PRISM SHEET)
53 (DIFFUSING PLATE)
51 (LIGHT SOURCE)
52 (REFLECTION FILM)

50' (LIGHTING DEVICE)
55 (BRIGHTNESS ENHANCEMENT FILM)
54 (PRISM SHEET)
53 (DIFFUSING PLATE)
57 (LIGHT REFLECTOR)
51 (LIGHT SOURCE)
56 (LIGHT PIPE)
52 (REFLECTION FILM)

LIQUID CRYSTAL DISPLAY

FIELD OF THE INVENTION

The present invention relates to a liquid crystal display at least comprising a liquid crystal panel and a lighting device.

BACKGROUND OF THE INVENTION

A liquid crystal display has attracted attention for its properties such as being thin, being lightweight, and having low power consumption, and is widely used in portable devices such as a cellular phone and a watch; office automation (OA) devices such as a personal computer monitor and a notebook-size personal computer; and home appliances such as a video camera and a liquid crystal television. This is because disadvantages in that its display properties change depending on an angle from which a display is viewed and that the liquid crystal display cannot operate at high temperatures and very low temperatures have been overcome by technical innovations. However, wide-ranging uses have required different properties in accordance with the uses. For example, in a conventional liquid crystal display, as a viewing angle property, it has been considered sufficient that a contrast ratio between white/black displays may be about 10 in an oblique direction. This definition derives from a contrast ratio of black ink printed on white paper of newspapers, magazines, and the like. However, use for a large stationary television requires a display that can be viewed well from different viewing angles because several people view a display at the same time. Since light leak in black display invites rapid decrease in contrast ratio in a liquid crystal display, it is important to reduce light leak in all azimuth directions. Moreover, since weak color in the black display disturbs sharpness at color display, it is also important to make background color pure black. In use for a large color television, persons viewing the display feel unpleasant sensation and feeling of fatigue without improvement such technical problems.

In liquid crystal displays, various retardation films have hitherto been used. For example, there has been disclosed a liquid crystal display wherein a retardation film whose optical indicatrix has a relationship of nx>nz>ny is arranged on one side of an in-plane switching (IPS) mode liquid crystal cell to improve a contrast ratio in an oblique direction (see, e.g., JP-A-11-305217). However; a conventional liquid crystal display has problems such as large change in coloring (also referred to as large color shift) of images depending on a viewing angle when a display displaying a black image is viewed from an oblique direction. The display properties of such liquid crystal displays do not satisfy the level required for large color television use.

SUMMARY OF THE INVENTION

The invention is performed for solving such problems and an object thereof is to provide a liquid crystal display having a small light leak and color change (color shift) from all directions of 360° when the display displaying a black image is viewed from an oblique direction.

As a result of investigation on the cause of large color shift in conventional liquid crystal displays, the present inventors have found that, under an assumption of bad balanced emission from a light source of a lighting device, particularly in blue region, a liquid crystal display exhibiting a dramatically small color shift as compared with conventional ones by combining a first optical element having specific optical properties and a lighting device.

The present invention is mainly directed to the following items:

1. A liquid crystal display comprising: a liquid crystal panel; and a lighting device disposed on one side of the liquid crystal panel, the liquid crystal panel comprising: a liquid crystal cell; a first polarizer disposed on one side of the liquid crystal cell; a second polarizer disposed on the other side of the liquid crystal cell; and a first optical element disposed between the liquid crystal cell and the first polarizer; the absorption axis direction of the first polarizer being substantially perpendicular to the absorption axis direction of the second polarizer, the first optical element having an optical indicatrix having a relationship of $nx \geq nz > ny$, the lighting device having: a maximum value of luminance in the wavelength range of 550±50 nm; and a relative luminance at a wavelength of 450 nm is 0.28 or less.

2. The liquid crystal display according to item 1, wherein the liquid crystal cell comprises a liquid crystal layer containing homogeneously oriented liquid crystal molecules in the absence of an electric field.

3. The liquid crystal display according to item 2, wherein the liquid crystal molecules have a pre-tilt angle of 10° or less.

4. The liquid crystal display according to item 1, wherein the initial orientation direction of the liquid crystal cell is substantially parallel to the absorption axis direction of the second polarizer.

5. The liquid crystal display according to item 1, wherein the slow axis direction of the first optical element is substantially perpendicular to the absorption axis of the first polarizer.

6. The liquid crystal display according to item 1, wherein the first optical element has a Re[550] of 100 to 300 nm.

7. The liquid crystal display according to item 1, wherein the first optical element has a wavelength dispersion value (D) of 0.90 to 1.10.

8. The liquid crystal display according to item 1, wherein the first optical element has an Nz coefficient of −0.2 to 0.8.

9. The liquid crystal display according to item 1, wherein the first optical element comprises a retardation film containing a norbornene-based resin.

10. The liquid crystal display according to item 1, wherein the liquid crystal panel further comprises a second optical element between the first polarizer and the first optical element, and the second optical element has an optical indicatrix having a relationship of $nx = ny > nz$.

11. The liquid crystal display according to item 10, wherein the second optical element comprises a retardation film containing a cellulose-based resin.

12. The liquid crystal display according to item 1, wherein the lighting device comprises: a light source; a reflection film; a diffusion plate; and a prism sheet.

13. The liquid crystal display according to item 1, wherein the lighting device has a maximum value of relative luminance in the wavelength range of 450±50 nm of 0.05 to 0.28.

14. The liquid crystal display according to item 1, wherein the lighting device is disposed on a side opposite to the viewer side of the liquid crystal cell.

15. The liquid crystal display according to item 12, wherein the light source is at least one selected from the group consisting of a cold-cathode fluorescent tube, a light emitting diode, an organic EL, and a field emission-type element.

16. The liquid crystal display according to item 1, wherein a maximum value of Δa*b* in all azimuth directions (0° to 360°) at a polar angle of 60° upon displaying a black image is 12 or less.

17. The liquid crystal display according to item 1, where an average value of Δa*b* in all azimuth directions (0° to 360°) at a polar angle of 60° upon displaying a black image is 7 or less.

With regard to the liquid crystal display of the invention, a liquid crystal display exhibiting a dramatically small color shift in an oblique direction and capable of displaying a clear image can be obtained by using a first optical element and a lighting device in combination each having specific optical properties. Particularly, when one having a specific range of a wavelength dispersion value (D) is used as the above first optical element, a liquid crystal display exhibiting a remarkable reducing effect of color shift in an oblique direction and capable of displaying a clearer image can be obtained.

As described above, the liquid crystal display of the invention has a reduced color shift in an oblique direction and a reduced light leak in an oblique direction, and thus is very useful for improving display properties of the liquid crystal display. Therefore, the liquid crystal display of the invention may be suitably used for a television

BRIEF DESCRIPTION OF THE DRAWINGS

FIG. 1 is a schematic sectional view of a liquid crystal display according to a preferred embodiment of the invention.

FIG. 2A is a schematic perspective view of the liquid crystal display of FIG. 1 employing O-mode, and FIG. 2B is a schematic perspective view of a liquid crystal display employing E-mode.

Figure 3:
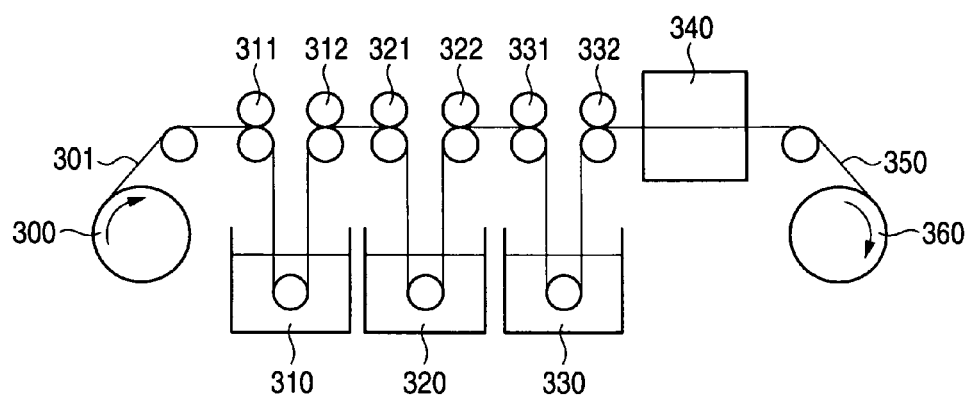
FIG. 3 is a schematic diagram showing a concept of a typical production process of a polarizer used in the invention.

The reference numerals used in the drawings denote the followings, respectively.
10: liquid crystal cell
11, 11': substrate
12: liquid crystal layer
21: first polarizer
22: second polarizer
30: first optical element
40: second optical element
50, 50': lighting device
51: light source
52: reflection film
53: diffusing plate
54: prism sheet
55: brightness enhancement film
56: light pipe
57: light reflector
100, 101, 102, 103: liquid crystal panel
201, 202, 203, 204: liquid crystal display
300: delivery part
310: aqueous iodine solution bath
320: aqueous solution bath containing boric acid and potassium iodide
330: aqueous solution bath containing potassium iodide
340: drying means
350: polarizer
360: winding part
401, 403, 405: delivery part
414, 416, 419: winding part
404, 406: shrinkable film
407, 408: laminate roll
409: heating means

DETAILED DESCRIPTION OF THE INVENTION

A. Outline of Entire Liquid Crystal Display

FIG. 1A and FIG. 1B each is a schematic sectional view of a liquid crystal display according to a preferred embodiment of the invention. FIG. 2A and FIG. 2B each is a schematic perspective view of the liquid crystal. FIG. 1A and FIG. 2A each is a schematic perspective view of the liquid crystal employing O-mode, and FIG. 1B and FIG. 2B each is a schematic perspective view of the liquid crystal employing E-mode. Note that, a ratio among length, width, and thickness of each member in FIG. 1A and FIG. 1B and FIG. 2A and FIG. 2B is different from that of an actual member for clarity.

The liquid crystal display 201 (or 202) comprises a liquid crystal panel 100 and a lighting device 50 arranged on one side of the liquid crystal panel 100. The liquid crystal panel 100 contains a liquid crystal cell 10, a first polarizer 21 arranged on one side of the liquid crystal cell 10, a second polarizer 22 arranged on the other side of the liquid crystal cell 10, and a first optical element 30 arranged between the liquid crystal cell 10 and the first polarizer 21. The absorption axis direction of the first polarizer 21 is substantially perpendicular to the absorption axis direction of the second polarizer 22. Optical indicatrix of the first optical element 30 has a relationship of $nx \geq nz > ny$. The lighting device 50 has a maximum luminance in the wavelength range of $550 \pm 50$ nm and relative luminance at a wavelength of 450 nm is 0.28 or less. In this regard, the relative luminance is luminance when the maximum luminance is regarded as 1 and nx, ny and nz are a refractive index in the slow axis direction, a refractive index in the fast axis direction, and a refractive index in the thickness direction, respectively.

For practical use, any appropriate protective layer (not shown) may be arranged on outer sides (opposite sides to the sides provided with the liquid crystal cell) of the first polarizer 21 and the second polarizer 22, between the first polarizer 21 and the first optical element 30, and/or the second polarizer 22 and the liquid crystal cell 10. The above protective layer preferably has substantially optical isotropy. Such a liquid crystal display has a characteristic that color shift is dramatically small in an oblique direction as compared with conventional liquid crystal displays.

The liquid crystal panel for use in the liquid crystal display of the invention may be of so-called O-mode or so-called E-mode. The term "liquid crystal panel of O-mode" means a liquid crystal panel in which the absorption axis direction of a polarizer arranged on a lighting device side of a liquid crystal cell and the initial orientation direction of the liquid crystal cell are parallel to each other. The term "liquid crystal panel of E-mode" means a liquid crystal panel in which the absorption axis of a polarizer arranged on a lighting device side of a liquid crystal cell and the initial orientation direction of the liquid crystal cell are perpendicular to each other. In the case of the liquid crystal panel of O-mode as shown in FIG. 2A, the first polarizer 21 and the first optical element 30 are preferably arranged on a viewer side of the liquid crystal cell 10, and the second polarizer 22 are preferably arranged on an opposite side (backlight side) to the viewer side of the liquid crystal cell. In the case of the liquid crystal panel of E-mode as shown in FIG. 2B, the first polarizer 21 and the first optical element 30 are preferably arranged on an opposite side (backlight side) to the viewer side of the liquid crystal cell 10, and the second polarizer 22 are preferably arranged on a viewer side of the liquid crystal cell 10.

The liquid crystal display of the present invention is not limited to the embodiments described above, and other members may be arranged between the members shown in FIG. 1, for example. Hereinafter, detailed description will be given of individual members and layers constituting the liquid crystal display according to the present invention.

B. Liquid Crystal Cell

Referring to FIG. 1, the liquid crystal cell 10 used in the invention comprises a pair of substrates 11 and 11' and a liquid crystal layer 12 as a display medium arranged between the substrates 11 and 11'. One substrate (active matrix substrate) 11' is provided with a switching element (typically TFT) for controlling electrooptic properties of liquid crystals, a scanning line for providing a gate signal to the active element and a signal line for providing a source signal thereto (all not shown). The other substrate (color filter substrate) 11 is provided with color filters. The color filter may be provided in the active matrix substrate 11' as well. Alternatively, when an RGB three-color light source is used as a lighting device for the liquid crystal display as in a field sequential mode, the above color filter may be omitted. A distance (cell gap) between the substrates 11 and 11' is controlled by a spacer (not shown). An alignment film (not shown) formed of, for example, a polyimide is provided on a side of each of the substrates 11 and 11' in contact with the liquid crystal layer 12.

The liquid crystal cell 10 preferably comprises a liquid crystal layer 12 containing homogeneously oriented liquid crystal molecules in the absence of an electric field. In such a liquid crystal layer (eventually, liquid crystal cell), typically, optical indicatrix has a relationship of $nx>ny=nz$ (wherein, $nx$ and $ny$ represent in-plane refractive indices and $nz$ represents a refractive index in the thickness direction). In the specification of the present invention, $ny=nz$ includes not only a case where $ny$ and $nz$ are perfectly equal, but also a case where $ny$ and $nz$ are substantially equal. Furthermore, the phrase "initial orientation direction of the liquid crystal cell" means a direction providing a maximum in-plane refractive index of the liquid crystal layer caused by orientation of liquid crystal molecules contained in the liquid crystal layer in the absence of an electric field.

Preferably, the initial orientation direction of the liquid crystal cell is substantially parallel to the absorption axis direction of the second polarizer. In the specification of the invention, the phrase "substantially parallel" includes a case where the initial orientation direction of the liquid crystal cell and the absorption axis of the second polarizer form an angle of 0°±2.0°, preferably 0°±1.0°, and more preferably 0°±0.5°. Moreover, the initial orientation direction of the liquid crystal cell is preferably substantially perpendicular to the absorption axis direction of the first polarizer. In the specification of the invention, the phrase "substantially perpendicular" includes a case where the initial orientation direction of the liquid crystal cell and the absorption axis of the first polarizer form an angle of 90°±2.0°, preferably 90°±1.0°, and more preferably 90°±0.5°.

Typical examples of drive modes using the liquid crystal layer whose optical indicatrix has a relationship of $nx>ny=nz$ include an in-plane switching (IPS) mode, a fringe field switching (FFS) mode; and a ferroelectric liquid crystal (FLC) mode. Specific examples of liquid crystals to be used for such drive modes include nematic liquid crystals and smectic liquid crystals. For example, the nematic liquid crystals are used for the IPS mode and the FFS mode, and the smectic liquid crystals are used for the FLC mode.

In the IPS mode, homogeneously oriented nematic liquid crystals in the absence of an electric field respond in an electric field parallel to substrates (also referred to as a horizontal electric field) generated between a counter electrode and a pixel electrode each formed of metal, for example, by utilizing an electrically controlled birefringence (ECB) effect. More specifically, as described in "Monthly Display July" (p. 83 to p. 88, published by Techno Times Co., Ltd., 1997) or "Ekisho vol. 2, No. 4" (p. 303 to p. 316, published by Japanese Liquid Crystal Society, 1998), in a normally black mode, the polarizing plates above and below the liquid crystal cell are arranged to be perpendicular to each other with orienting the initial orientation direction of the liquid crystal cell coincident with the absorption axis of one polarizer, whereby transmittance is decreased in the absence of an electric field to result in black display. On the other hand, under application of an electric field, liquid crystal molecules rotate while remaining parallel to the substrates, and thereby the transmittance is increased in accordance with a rotation angle to result in white display. The IPS mode herein includes a super in-plane switching (S-IPS) mode and an advanced super in-plane switching (AS-IPS) mode employing a V-shaped electrode, a zigzag electrode, or the like. Examples of a commercially available liquid crystal display of such IPS mode include 20V-type wide liquid crystal television "Wooo" (trade name, manufactured by Hitachi, Ltd.); 19-type liquid crystal display "ProLite E481S-1" (trade name, manufactured by Iiyama Corporation); and 17-type TFT liquid crystal display "FlexScan L565" (trade name, manufactured by Eizo Nanao Corporation).

In the FFS mode, homogeneously oriented nematic liquid crystals in the absence of an electric field respond in an electric field parallel to substrates (also referred to as a horizontal electric field) and generated between a counter electrode and a pixel electrode each formed of a transparent conductor, for example, by utilizing an electrically controlled birefringence (ECB) effect. Such an electric field in FFS mode is also referred to as a fringe electric field. The fringe electric field can be generated by setting a distance between the counter electrode and the pixel electrode each formed of a transparent conductor narrower than a distance between the upper and lower substrates (cell gap). More specifically, as described in "Society for Information Display (SID) 2001 Digest" (p. 484 to p. 487) or JP-A-2002-031812, in a normally black mode, the polarizing plates above and below the liquid crystal cell are arranged to be perpendicular to each other with orienting the initial orientation direction of the liquid crystal cell coincident with the absorption axis of one polarizer, whereby transmittance is decreased in the absence of an electric field to result in black display. On the other hand, under application of an electric field, liquid crystal molecules rotate while remaining parallel to the substrates, and thereby the transmittance is increased in accordance with a rotation angle to result in white display. The FFS mode herein includes an advanced fringe field switching (A-FFS) mode or an ultra fringe field switching (U-FFS) mode employing a V-shaped electrode, a zigzag electrode, or the like. An example of a commercially available liquid crystal display of such FFS mode includes Tablet PC "M1400" (trade name, manufactured by Motion Computing, Inc.).

The FLC mode utilizes, for example, a property that ferroelectric chiral smectic liquid crystals exhibit two stable molecular orientation states when encapsulated between electrode substrates each having a thickness of about 1 to 2 µm and the liquid crystal molecules rotate within a plane parallel to the substrates and respond due to application of a voltage. The FLC mode can provide black and white displays based on the same principle as those of the IPS mode and the FFS mode. The FLC mode has such a feature that a response speed is high as compared with other drive modes. The FLC mode herein includes a surface stabilized (SS-FLC) mode; an anti-ferroelectric (AFLC) mode; a polymer stabilized (PS-FLC) mode; and a V-shaped (V-FLC) mode.

The homogeneously oriented liquid crystal molecules are those wherein orientation vectors of the liquid crystal molecules are parallel to a substrate plane and uniformly oriented as a result of interaction between substrates subjected to orientation treatment and the liquid crystal molecules. The term "homogenous orientation" herein includes a case where the orientation vectors of the liquid crystal molecules are slightly inclined with respect to the substrate plane, that is, a case where the liquid crystal molecules are pre-tilted. In the case where the liquid crystal molecules are pre-tilted, a pre-tilt angle is preferably 10° or less, more preferably more than 0° and not more than 5°. When the pre-tilt angle falls within the above range, a liquid crystal display having a high contrast ratio may be obtained.

Any appropriate nematic liquid crystals may be employed as the nematic liquid crystals in accordance with the purpose. For example, the nematic liquid crystals may have positive dielectric anisotropy or negative dielectric anisotropy. An example of the nematic liquid crystals having positive dielectric anisotropy includes "ZLI-4535" (trade name, manufactured by Merck Ltd.). An example of the nematic liquid crystals having negative dielectric anisotropy includes "ZLI-2806" (trade name, manufactured by Merck Ltd.). The birefringence of the nematic liquid crystals measured at 23° C. with light having a wavelength of 589 nm is usually from 0.05 to 0.15. In this regard, the birefringence can be determined from the difference (ne−no) between an extraordinary refractive index (ne) and an ordinary refractive index (no) obtained by orienting the liquid crystal molecules evenly and uniformly and measuring the refractive indices.

Any appropriate smectic liquid crystals may be employed as the smectic liquid crystals in accordance with the purpose. The smectic liquid crystals preferably have an asymmetric carbon atom in a part of a molecular structure and exhibit ferroelectric property (also referred to as ferroelectric liquid crystals). Examples of the smectic liquid crystals exhibiting ferroelectric property include p-decyloxybenzylidene-p'-amino-2-methylbutylcinnamate, p-hexyloxybenzylidene-p'-amino-2-chloropropylcinnamate, and 4-o-(2-methyl)-butyl-resorcylidene-4'-octylamine. Alternatively, as the ferroelectric liquid crystals, commercially available ones can be used as they are. Examples of commercially available ferroelectric liquid crystals include ZLI-5014-000 (trade name, capacitance of 2.88 nF, spontaneous polarization of −2.8 C/cm$^2$, manufactured by Merck Ltd.), ZLI-5014-100 (trade name, capacitance of 3.19 nF, spontaneous polarization of −20.0 C/cm$^2$, manufactured by Merck Ltd.), and FELIX-008 (trade name, capacitance of 2.26 nF, spontaneous polarization of −9.6 C/cm$^2$, manufactured by Hoechst).

Any appropriate cell gap may be employed as the cell gap (distance between substrates) of the liquid crystal cell in accordance with the purpose. However, the cell gap is preferably 1 µm to 7 µm. A cell gap within the above range may provide a liquid crystal display exhibiting a short response time.

C. Polarizer

In the specification, a polarizer means an element capable of converting natural light or polarized light into appropriate polarized light. Any appropriate polarizer may be employed as a polarizer to be used in the invention. Preferably, the polarizer is capable of converting natural light or polarized light into linearly polarized light. When incident light is separated into two polarized components perpendicular to each other, such a polarizer has a function of transmitting one of the polarized components and also has one or more functions selected from functions of absorbing, reflecting, and scattering the other polarized component.

The polarizer may have any appropriate thickness in accordance with the purpose. The thickness of the polarizer is usually from 5 µm to 80 µm.

C-1. Optical Properties of Polarizer

A light transmittance of the polarizer at a wavelength of 550 nm when measured at 23° C. (also referred to as single transmittance) is preferably 41% or more, and more preferably 43% or more. A theoretical upper limit of the single transmittance is 50% and a feasible upper limit is 46%. A degree of polarization is preferably 99.8% or more, and more preferably 99.9% or more. A theoretical upper limit of the degree of polarization is 100%. A single transmittance and a degree of polarization within the above ranges can reduce light leak in a front direction and as a result, a liquid crystal display exhibiting a high contrast ratio can be obtained.

The hue: a value (single a value) of the polarizer to be used in the invention according to National Bureau of Standards is preferably −2.0 or more, more preferably −1.8 or more. In this regard, an ideal value of the above a value is 0. Moreover, the hue: b value (single b value) of the polarizer according to National Bureau of Standards is preferably 3.8 or less, more preferably 3.5 or less. In this regard, an ideal value of the above b value is 0. Use of a polarizer having a value and b value both close to 0 provides a liquid crystal display exhibiting a bright-colored display image.

The single transmittance, the degree of polarization, and the hue can be determined using a spectrophotometer "DOT-3" (trade name, manufactured by Murakami Color Research Laboratory). The degree of polarization can be determined by measuring a parallel light transmittance ($H_0$) and a perpendicular light transmittance ($H_{90}$) of the polarizer and using the following equation: Degree of polarization (%)=$\{(H_0-H_{90})/(H_0+H_{90})\}^{1/2} \times 100$. The parallel light transmittance ($H_0$) means a transmittance of a parallel laminate polarizer produced by superposing two identical polarizers such that respective absorption axis directions are parallel to each other. The perpendicular light transmittance ($H_{90}$) means a remittance of a perpendicular laminate polarizer produced by superposing two identical polarizers such that respective absorption axis directions are perpendicular to each other. The light transmittance means a Y value obtained through color correction by a two-degree field of view (C source) in accordance with JIS Z8701-1982.

C-2. Means for Arranging Polarizer

Referring to FIGS. 2A and 2B, any appropriate method may be employed as a method of arranging the first polarizer 21 and the second polarizer 22 depending on the purpose. Preferably, the first polarizer 21 is provided with an adhesive layer (not shown) on a surface opposing the liquid crystal cell 10 and is attached to a surface of the first optical element 30. The second polarizer 22 is provided with an adhesive layer (not shown) on a surface opposing the liquid crystal cell 10 and is attached to a surface of the liquid crystal cell 10. When an optional optical element is provided between the liquid crystal cell 10 and the second polarizer 22, the second polarizer 22 is attached to any of the above optional optical element. In this regard, in the liquid crystal display of the invention, the first polarizer and the second polarizer may be the same or different from each other.

By attaching the polarizers in such a manner, deviation of the absorption axis of the polarizers from a predetermined position can be prevented and also abrading of the polarizers and neighboring individual optical elements can be prevented during the incorporation of the polarizers into a liquid crystal display. Furthermore, since adverse effects derived from reflection and refraction generated at an interface between the polarizer and neighboring each optical element can be reduced, a liquid crystal display capable of displaying a bright image can be obtained. In the specification, the term "adhesive layer" is not particularly limited as far as it can adhere surfaces of the optical element and polarizer adjacent to each other and integrate them with an adhesive force and adhesive time which practically do not adversely affect. Specific examples of the adhesive layer include an adhesive agent layer or an anchor coat layer. The adhesive layer may be a multi-layer structure wherein an anchor coat layer is formed on an adherend and then an adhesive agent layer is formed thereon.

The first polarizer 21 is arranged such that its absorption axis direction is substantially perpendicular to the absorption axis direction of the second polarizer 22. In the specification, the phrase "substantially perpendicular" includes a case where the absorption axis of the first polarizer 21 and the absorption axis of the second polarizer 22 form an angle of 90°±2.0°, preferably 90°±1.0°, and more preferably 90°±0.5°.

Any appropriate thickness may be employed as the thickness of the adhesive layer in accordance with the purpose. The thickness of the adhesive layer is usually from 0.1 µm to 50 µm. The thickness of the adhesive layer within the above range may provide an optical element and polarizer to be adhered without detachment or exfoliation and result in an adhesive force and adhesive time which practically do not adversely affect.

Any appropriate adhesive agent or anchor coat agent may be employed as a material for forming the adhesive layer in accordance with the kind of adherend and the purpose. Specific examples of the adhesive agent include solvent-type adhesive agents, emulsion-type adhesive agents, pressure-sensitive adhesive agents, re-wetting adhesive agents, polycondensation-type adhesive agents, non-solvent-type adhesive agents, film-type adhesive agents, and hot-melt-type adhesive agents according to classification based on form. According to classification based on chemical structure, there may be mentioned synthetic resin adhesive agents, rubber-based adhesive agents, and natural adhesive agents. The above adhesive agents include viscoelastic materials showing an adhesive force sensitive by contact with pressure at ordinary temperature (also referred to as pressure-sensitive adhesive agents).

When a polymer film containing a polyvinyl alcohol-based resin as a main component is used for the polarizer, a material constituting the above adhesive layer is preferably a water-soluble adhesive agent. As the water-soluble adhesive agent, a water-soluble adhesive agent containing a polyvinyl alcohol-based resin as a main component is preferably used. For the above adhesive layer, a commercially available adhesive agent may be used as it is. Alternatively, it is also possible to use a commercially available adhesive agent with adding a solvent or an additive. An example of the commercially available adhesive agent containing a polyvinyl alcohol-based resin as a main component is "GOHSEFIMER Z200" (trade name, manufactured by Nippon Synthetic Chemical Industry Co., Ltd.).

The water-soluble adhesive agent may further contain a crosslinking agent. Examples of the kind of the crosslinking agent include amine compounds, aldehyde compounds, methylol compounds, epoxy compounds, isocyanate compounds, and polyvalent metal salts. As the crosslinking agent, a commercially available one can be used as it is. Examples of the commercially available crosslinking agent include an amine compound "Methaxylenediamine" (trade name, manufactured by Mitsubishi Gas Chemical Company, Inc.), an aldehyde compound "Glyoxal" (trade name, manufactured by Nippon Synthetic Chemical Industry Co., Ltd.), and a methylol compound "Water sol" (trade name, manufactured by Dainippon Ink & Chemicals, Inc.).

C-3. Optical Film Used for Polarizer

Any appropriate polarizing film may be employed as the optical film to be used as the polarizer. The polarizer can be obtained, for example, by stretching a polymer film containing a polyvinyl alcohol-based resin as a main component, which contains iodine or a dichroic substance. Alternatively, there may be used an O-type polarizer prepared by orienting in a specific direction a liquid crystal composition containing a dichroic substance and a liquid crystal compound as disclosed in U.S. Pat. No. 5,523,863 and an E-type polarizer prepared by orienting lyotropic liquid crystals in a specific direction as disclosed in U.S. Pat. No. 6,049,428.

The polarizer is preferably a stretched film of a polymer film containing a polyvinyl alcohol-based resin as a main component, which contains iodine or a dichroic substance. As a result, a liquid crystal display exhibiting a high contrast ratio in a front direction can be obtained. The polymer film containing a polyvinyl alcohol-based resin as a main component is produced through a method described in Example 1 of JP-A-2000-315144, for example. Alternatively, a commercially available polymer film can be used as it is. Examples of the commercially available polymer film include "Kuraray Vinylon Film" (trade name, manufactured by Kuraray Co., Ltd.), "Tohcello Vinylon Film" (trade name, manufactured by Tohcello Co., Ltd.), and "Nichigo Vinylon Film" (trade name, manufactured by Nippon Synthetic Chemical Industry Co., Ltd.).

The polyvinyl alcohol-based resin to be used may be prepared by polymerizing a vinyl ester-based monomer to obtain a vinyl ester-based polymer and saponifying the vinyl ester-based polymer to convert vinyl ester units into vinyl alcohol units. Examples of the vinyl ester-based monomer include vinyl formate, vinyl acetate, vinyl propionate, vinyl valerate, vinyl laurate, vinyl stearate, vinyl benzoate, vinyl pivalate, and vinyl versatate.

The polyvinyl alcohol-based resin may have any appropriate average degree of polymerization in accordance with the purpose. The average degree of polymerization is usually from 1,200 to 3,600. The average degree of polymerization can be determined in accordance with JIS K6726-1994.

A degree of saponification of the polyvinyl alcohol-based resin is usually from 95.0 mol % to 99.9 mol % from the viewpoint of durability of the polarizer. The degree of saponification means a ratio of units actually saponified into vinyl alcohol units to units which may be converted into vinyl alcohol units through saponification. The degree of saponification of the polyvinyl alcohol-based resin may be determined in accordance with JIS K6726-1994.

The polymer film containing a polyvinyl alcohol-based resin as a main component to be used in the invention may preferably contain a polyhydric alcohol as a plasticizer. The polyhydric alcohol is used for the purpose of enhancing dye-affinity and drawing ability of the polarizer. Examples of the polyhydric alcohol include ethylene glycol, glycerin, propylene glycol, diethylene glycol, triethylene glycol, tetraethylene glycol, and trimethylolpropane. They may be used singly or in combination. An amount of the polyhydric alcohol to be contained is usually more than 0 and not more than 5 (weight ratio) with respect to 100 of the polyvinyl alcohol-based resin.

The polymer film containing a polyvinyl alcohol-based resin as a main component may further contain a surfactant. The surfactant is used for the purpose of enhancing dye-affinity and drawing ability of the polarizer. Examples of the surfactant include anionic surfactants, cationic surfactant, and nonionic surfactants. The surfactant is preferably a nonionic surfactant. Examples of the nonionic surfactant include lauric acid diethanolamide, palm-oil fatty acid diethanolamide palm-oil fatty acid monoetholamide, lauric acid monoisopropanolamide, and oleic acid monoisopropanolamide. An amount of the surfactant to be contained is usually more than 0 and not more than 5 (weight ratio) with respect to 100 of the polyvinyl alcohol-based resin.

Any appropriate dichroic substance may be employed as the dichroic substance. In the specification, the term "dichroic" means optical anisotropy in which light absorption differs in two directions of an optical axis direction and a direction perpendicular thereto. Examples of the dichroic dye include Red BR, Red LR, Red R, Pink LB, Rubin BL, Bordeaux GS, Sky Blue LC; Lemon Yellow, Blue BR, Blue 2R, Navy RY, Green LG; Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue C; Supra Blue GL, Supra Orange GL, Direct Sky Blue, Direct Fast Orange S, and Fast Black.

An example of a method of producing a polarizer will be described by referring to FIG. 3. FIG. 3 is a schematic diagram showing a concept of a typical production process of a polarizer to be used in the invention. For example, a polymer film 301 containing a polyvinyl alcohol-based resin as a main component is fed from a feed part 300, immersed in an aqueous iodine solution bath 310, and subjected to swelling and coloring treatment under tension in a machine direction of the film by rollers 311 and 312 at different speed ratios. Next, the film is immersed in a bath 320 of an aqueous solution containing boric acid and potassium iodide, and subjected to crosslinking treatment under tension in a machine direction of the film by rollers 321 and 322 at different speed ratios. The film subjected to crosslinking treatment is immersed in a bath 330 of an aqueous solution containing potassium iodide by rollers 331 and 332, and subjected to water washing treatment. The film subjected to water washing treatment is dried by drying means 340 to adjust its moisture content, and taken up in a winding part 360. The polymer film containing a polyvinyl alcohol-based resin as a main component may be stretched to 5 to 7 times length of the original length through the above process, to thereby provide a polarizer 350.

The polarizer 350 may have any appropriate moisture content in accordance with the purpose, but the moisture content is usually from 10% to 30%. The moisture content within the above range may provide a polarizer excellent in appearance uniformity.

D. First Optical Element

In the first optical element, optical indicatrix has a relationship of $n_x > n_z > n_y$ or $n_x = n_z > n_y$ where a refractive index in the slow axis direction is represented by $n_x$, a refractive index in the fast axis direction by $n_y$, and a refractive index in the thickness direction by $n_z$. In the specification, $n_x = n_z$ includes not only a case where $n_x$ and $n_z$ are perfectly equal, but also a case where $n_x$ and $n_z$ are substantially equal. In this regard, a phrase "a case where $n_x$ and $n_z$ are substantially equal" includes a case where an absolute value of a difference between retardations in the thickness direction ($|Rth[550]|$) is less than 10 nm.

When the optical indicatrix: the relationship of $n_x > n_z > n_y$ is expressed by $Re[550]$ and $Rth[550]$, the first optical element satisfies the following equation (1).

$$10 \text{ nm} \leq Rth[550] < Re[550] \quad (1)$$

When the optical indicatrix: the relationship of $n_x = n_z > n_y$ is expressed by $Re[550]$ and $Rth[550]$, the first optical element satisfies the following equations (2) and (3):

$$10 \text{ nm} \leq Re[550] \quad (2)$$

$$|Rth[550]| < 10 \text{ nm} \quad (3)$$

wherein $Re[550]$ and $Rth[550]$ are an in-plane retardation value and a thicknesswise retardation value measured at 23° C. with light having a wavelength of 550 nm, respectively.

In the invention, the first optical element is used for reducing light leak in an oblique direction of a liquid crystal display which displays a black image. Usually, in a liquid crystal display having two polarizers arranged on both sides of the liquid crystal cell such that the absorption axis directions thereof are perpendicular to each other, light leaks in an oblique direction. Specifically, when a long side of a liquid crystal panel is regarded as 0°, there is a tendency that a maximum light leak is observed in an oblique direction at 45° or 135°. In the liquid crystal display of the invention, by using the first optical element having a specific relationship of optical indicatrix, the light leak can be reduced and, as a result, a liquid crystal display exhibiting a high contrast ratio in an oblique direction may be obtained.

Referring to FIGS. 2A and 2B, the first optical element 30 is arranged between the liquid crystal cell 10 and the first polarizer 21. Preferably, the slow axis direction of the first optical element 30 is substantially perpendicular to the absorption axis direction of the first polarizer 21. Thus, by using the first optical element in a specific positional relationship, a liquid crystal display having a small light leak and color change (color shift) in all azimuth directions, i.e., 360° can be obtained when a display displaying a black image is viewed in an oblique direction. In the specification, the phrase "substantially perpendicular" includes a case where the slow axis direction of the first optical element 30 and the absorption axis of the first polarizer 21 form an angle of 90°±2.0°, preferably 90°±1.0°, and more preferably 90°±0.5°. The smaller deviation in angle between the slow axis direction of the first optical element and the absorption axis of the first polarizer may provide a liquid crystal display having a smaller amount of light leak in front and oblique directions.

D-1. Optical Properties of First Optical Element

In the specification, Re[550] means an in-plane retardation value measured at 23° C. with light having a wavelength of 550 nm. The term "in-plane retardation value" means an in-plane retardation value of the film when the optical element is constituted by a single retardation film but, when the optical element is constituted by a laminate containing a retardation film, it means an in-plane retardation value of the whole laminate. Re[550] can be determined from an equation: Re[550]=(nx−ny)×d (wherein, nx and ny respectively represent refractive indices of an optical element in the slow axis direction and in the fast axis direction at a wavelength of 550 nm, and d (nm) represents a thickness of the optical element. Note that, the slow axis means a direction providing a maximum in-plane refractive index.

Any appropriate value may be selected as Re[550] of the first optical element in accordance with the purpose. Re[550] of the first optical element is preferably 10 nm or more, more preferably from 100 to 300 nm, and still more preferably from 120 to 280 nm. Re[550] of the first optical element within the above range may provide a liquid crystal display having a small light leak and color change (color shift) in all azimuth directions, i.e., 360° when a display displaying a black image is viewed in an oblique direction.

In one embodiment, between the first polarizer and the second polarizer of the liquid crystal display of the invention, the first optical element alone is used as an optical element for optically compensation of the liquid crystal cell. In this case, the optical indicatrix of the first optical element preferably has a relationship of nx>nz>ny. Furthermore, Re[550] of the first optical element is preferably from 220 nm to 300 nm, and more preferably from 240 nm to 280 nm.

In another embodiment, between the first polarizer and the second polarizer of the liquid crystal display of the invention, the first optical element and a second optical element to be described below are used as optical elements for optically compensation of the liquid crystal cell. In this case, the optical indicatrix of the first optical element preferably has a relationship of nx>nz>ny or a relationship of nx=nz>ny. Furthermore, as Re[550] of the first optical element, an appropriate value may be selected depending on the value of Rth[550] of the second optical element. Preferably, Re[550] of the first optical element is determined such that total value of Re[550] of the first optical element and Rth[550] of the second optical element (Re[550]+Rth[550]) becomes from 220 nm to 300 nm. For example, when Rth[550] of the second optical element is 40 nm, Re[550] of the first optical element is preferably from 180 nm to 260 nm. Alternatively, when Rth[550] of the second optical element is 60 nm, Re[550] of the first optical element is preferably from 160 nm to 240 nm. Alternatively, when Rth[550] of the second optical element is 100 nm, Re[550] of the first optical element is preferably from 120 nm to 200 nm.

The wavelength dispersion value (D) of the first optical element is preferably from 0.90 to 1.10, more preferably from 0.95 to 1.05, particularly preferably from 0.97 to 1.03, and most preferably from 0.98 to 1.02. The wavelength dispersion value (D) is a value calculated from the expression: Re[450]/Re[550] wherein Re[450] and Re[550] are in-plane retardation values measured at 23° C. with light having a wavelength of 450 nm and light having a wavelength of 550 nm, respectively. Thus, by combining the first optical element having a wavelength dispersion value (D) within the above range and a lighting device having a specific optical characteristic, the liquid crystal display of the invention exhibits a remarkable effect of reducing color shift in an oblique direction and hence it becomes possible to display more clear image.

Any appropriate method may be employed as a method of controlling the wavelength dispersion value (D)) of the first optical element. For example, as described in FIG. 2 of JP-A-5-027119, the wavelength dispersion can be designed to any value by selecting an appropriate material for constituting the first optical element. Moreover, the wavelength dispersion can be controlled by molecular design of a material for constituting the first optical element. Specifically, as described in WO00/26705, the wavelength dispersion can be set at any value depending on the kind of monomers to be used or copolymerization ratio in a resin obtained by copolymerization of two monomers. Alternatively, as described in a catalog of Teijin Kasei Co., Ltd. "PURE-ACE" p. 8 (2005), an appropriate one can be selected among commercially available retardation films having different wavelength dispersions.

In the specification, Rth[550] is a thicknesswise retardation value measured at 23° C. with light having a wavelength of 550 nm. The term "thickness direction retardation value" means a thicknesswise retardation value of the film when the optical element is constituted by a single retardation film but, when the optical element is constituted by a laminate containing a retardation film, it means a thicknesswise retardation value of the whole laminate. Rth[550] can be determined from an equation: Rth[550]=(nx−nz)×d (wherein, nx and nz respectively represent refractive indices of an optical element in the slow axis direction and in the thickness direction at a wavelength of 550 nm, and d (nm) represents a thickness of the optical element. Note that, the slow axis means a direction providing a maximum in-plane refractive index.

Any appropriate value may be selected as Rth[550] of the first optical element in accordance with the purpose. In one embodiment, when the optical indicatrix of the first optical element has a relationship of nx>nz>ny, Rth[550] of the first optical element is preferably from 10 nm to 180 nm, and more preferably 20 nm to 150 m. In another embodiment, when the optical indicatrix of the first optical element has a relationship of nx=nz>ny, an absolute value (|Rth[550]|) of Rth[550] of the first optical element is less than 10 nm. The above |Rth [550]| is preferably 8 nm or less, and more preferably 5 nm or less. Rth[550] of the first optical element within the above range may provide a liquid crystal display having a small light leak and color change (color shift) in all azimuth directions, i.e., 360° when a display displaying a black image is viewed in an oblique direction.

Re[550] and Rth[550] may be determined using a spectro-elipsometer "M-220" (trade name, manufactured by JASCO Corporation). Refractive indices nx, ny, and nz can be determined using an in-plane retardation value (Re) at a wavelength of 550 nm at 23° C., a retardation value (R40) measured by inclining the slow axis by 40° as a tilt angle, a thickness (d) of the optical element, and an average refractive index (n0) of the optical element and using the following equations (i) to (iii) for computational numerical calculation. Then, Rth can be calculated from the following equation (iv). Here, $\phi$ and ny' are represented by the following respective equations (v) and (vi).

$$Re=(nx-ny)\times d \qquad (i)$$

$$R40=(nx-ny')\times d/\cos(\phi) \qquad (ii)$$

$$(nx+ny+nz)/3=n0 \qquad (iii)$$

$$Rth=(nx-nz)\times d \qquad (iv)$$

$$\phi=\sin^{-1}[\sin(40°)/n0] \qquad (v)$$

$$ny'=ny\times nz/[ny^2\times\sin^2(\phi)+nz^2\times\cos^2(\phi)]^{1/2} \qquad (vi)$$

The Nz coefficient of the first optical element is preferably from −0.2 to 0.8 and more preferably from 0 to 0.6. The Nz coefficient is a value calculated from the expression: Rth[550]/Re[550]. The Nz coefficient of the first optical element within the above range may provide a liquid crystal display having a small light leak and color change (color shift) in all azimuth directions, i.e., 360° when a display displaying a black image is viewed in an oblique direction.

In one embodiment, between the first polarizer and the second polarizer of the liquid crystal display of the invention, the first optical element alone is used as an optical element for optically compensation of the liquid crystal cell. In this case, the Nz coefficient of the first optical element is preferably from 0.2 to 0.8, and more preferably from 0.3 to 0.7, particularly preferably from 0.4 to 0.6, and most preferably 0.5.

In another embodiment, between the first polarizer and the second polarizer of the liquid crystal display of the invention, the first optical element and a second optical element to be described below are used as optical elements for optically compensation of the liquid crystal cell. In this case, as the Nz coefficient of the first optical element, an appropriate value may be selected depending on the value of Rth[550] of the second optical element. For example, when Rth[550] of the second optical element is 40 nm, the Nz coefficient of the first optical element is preferably from 0.2 to 0.4. Alternatively, when Rth[550] of the second optical element is 60 nm, the Nz coefficient of the first optical element is preferably from 0.1 to 0.3. Alternatively, when Rth[550] of the second optical element is 100 nm, the Nz coefficient of the first optical element is preferably from −0.2 to 0.2.

D-2. Means for Arranging First Optical Element

Referring to FIG. 1, any appropriate method may be employed as a method of arranging the first optical element 30 depending on the purpose. Preferably, an adhesive layer (not shown) is provided between the first optical element 30 and the first polarizer 21 and between the first optical element 30 and the liquid crystal cell 10, and respective optical members are adhered to each other. Thus, a gap between the optical elements is filled with the adhesive layer, to thereby prevent shift in relationship among optical axes of the respective optical elements and damages of the optical elements through abrasion to each other when the optical elements are incorporated into a liquid crystal display. Furthermore, adverse effects caused by interface reflection and refraction between layers of optical elements may be reduced, so that a liquid crystal display capable of displaying a bright image can be obtained.

A thickness of the adhesive layer may be appropriately determined in accordance with the purpose. The thickness of the adhesive layer is usually from 0.1 µm to 50 µm. The thickness of the adhesive layer within the above range may provide an optical element and polarizer to be adhered without no exfoliation and result in an adhesive force and adhesive time which practically do not adversely affect.

As a material for forming the adhesive layer, any appropriate one may be selected among those exemplified in the section C-2. Preferably, the material for forming the adhesive layer is a pressure sensitive adhesive agent (also referred to as acrylic pressure sensitive adhesive agent) containing an acrylic polymer as a base polymer. This is because it is excellent in optical transparency, pressure sensitive adhesive properties, weatherability, and heat resistance. For the above adhesive layer, a commercially available double-face optical tape may be used as it is. An example of the commercially available double-face optical tape includes "SK-2057" (trade name, available from Soken Chemical & Engineering Co., Ltd.).

D-3. Structure of First Optical Element

A structure (laminate structure) of the first optical element is not particularly limited as long as the first optical element satisfies the optical properties described in the above-mentioned section D-1. Specifically, the first optical element may be a single retardation film, or a laminate of two or more retardation films. The first optical element is preferably a single retardation film. The first optical element as a laminate may include an adhesive layer. When the first optical element as a laminate includes two or more retardation films, the retardation films may be identical to or different from each other. Details of the retardation film will be described in the section D-4.

Re[550] and Rth[550] of the retardation film used for the first optical element can be appropriately selected in accordance with the number of retardation films to be used. For example, when the first optical element is formed of a single retardation film, Re[550] and Rth[550] of the retardation film are preferably equal to Re[550] and Rth[550] of the first optical element, respectively. Thus, a retardation value of an adhesive layer used for lamination of the first optical element on the polarizer is preferably as small as possible. Furthermore, when the first optical element is a laminate including two or more retardation films, for example, totals of Re[550] and Rth[550] of the retardation films are preferably designed to be equal to Re[550] and Rth[550] of the first optical element, respectively.

Specifically, the first optical element having Re[550] of 200 nm and Rth[550] of 80 nm can be obtained by laminating two retardation films each having Re[550] of 100 nm and Rth[550] of 40 nm such that respective slow axis directions are parallel to each other. The present specification describes the cases each employing two or less retardation films for simplicity, but the present invention may obviously be applied to a laminate including three or more retardation films.

A total thickness of the first optical element is usually 20 µm to 200 µm although the thickness may vary depending on the structure of the element.

D-4. Retardation Film Used for First Optical Element

As the retardation film used for the first optical element, any appropriate one may be employed, but a retardation film preferably used has excellent transparency, mechanical strength, thermal stability, water barrier property, and the like and hardly causes optical unevenness due to distortion.

The thickness of the retardation film may vary depending on the number of films to be laminated. Typically, the thickness of the retardation film is determined such that the total thickness of the first optical element becomes preferably 20 µm to 200 µm. For example, when the first optical element is formed of a single retardation film, the thickness of the retardation film is preferably from 20 µm to 200 µm, which is equal to the total thickness of the first optical element. For example, when the first optical element is a laminate of two retardation films, the thickness of each retardation film may be any appropriate one as long as the total thickness thereof is equal to the preferable total thickness of the first optical element. Thus, the thickness of each retardation film may be the same or different from each other. In one embodiment wherein two retardation films are laminated, the thickness of one retardation film is preferably from 10 µm to 100 µm.

A transmittance of the retardation film measured at 23° C. with light having a wavelength of 550 nm is usually 80% or more, and preferably 90% or more. In this regard, the first optical element also preferably has a similar transmittance. A theoretical upper limit of the transmittance is 100% and a feasible upper limit is 96%.

An absolute value of photoelastic coefficient of the retardation film $(C[550](m^2/N))$ is preferably $1\times10^{-12}$ to $100\times10^{-12}$, more preferably $1\times10^{-12}$ to $60\times10^{-12}$, and most preferably $1\times10^{-12}$ to $10\times10^{-12}$. Use of a retardation film having an absolute value of photoelastic coefficient within the above range may provide a liquid crystal display exhibiting an excellent display uniformity.

With regard to unevenness of angle of the slow axis of the retardation film (also referred to as orientation angle), preferably used is a film wherein a range of unevenness of the orientation angle at five measuring points set at equal intervals in a film transverse direction is or less. More preferred range is $\pm1°$ or less. The unevenness of the orientation angle is ideally 0. The unevenness of the orientation angle within the above range may provide a liquid crystal display exhibiting an excellent display uniformity and capable of displaying a bright image. The orientation angle can be appropriately controlled by a stretching means, stretching method, stretching temperature, and stretching magnitude.

The first optical element to be use in the invention preferably contains a retardation film containing a thermoplastic resin showing positive intrinsic birefringence. The retardation film is preferably a stretched film of a polymer film containing the thermoplastic resin showing positive intrinsic birefringence. In the specification, the term "stretched film" means a plastic film obtained by applying a tensile force to an unstretched film at an appropriate temperature to enhance molecular orientation along the drawing direction. In addition, the term "thermoplastic resin showing positive intrinsic birefringence" means a resin which show such a property that, when a polymer film containing the resin is stretched in one direction, a direction (slow axis direction) of increasing an in-plane refractive index of the film is substantially parallel to the stretching direction. When such a polymer film containing a thermoplastic resin showing positive intrinsic birefringence is used, an optical element having optical properties described in the section D-1 can be efficiently produced by the stretching method utilizing a shrinkable film to be mentioned below, for example.

As the thermoplastic resin showing positive intrinsic birefringence, there may be mentioned general-purpose plastics such as a polyolefin resin, a cycloolefin-based resin, a polyvinyl chloride-based resin, a cellulose-based resin, and a polyvinylidene chloride-based resin; general-purpose engineering plastics such as a polyamide-based resin, a polyacetal-based resin, a polycarbonate-based resin, a modified polyphenylene ether-based resin, a polybutylene terephthalate-based resin, and a polyethylene terephthalate-based resin; and super engineering plastics such as a polyphenylene sulfide-based resin, a polysulfone-based resin, a polyether sulfone-based resin, a polyether ether ketone-based resin, a polyarylate-based resin, a liquid crystalline resin, a polyamide-imide-based resin, a polyimide-based resin, and a polytetrafluoroethylene-based resin. The thermoplastic resins may be used alone or in combination of two or more thereof. The thermoplastic resins may be used after having been subjected to any appropriate polymer modification. Examples of the polymer modification include copolymerization, cross-linking, a molecular terminal modification, and stereoregularity modification.

More preferably, the first optical element to be used in the invention contains a retardation film containing a norbornene-based resin. Since the retardation film containing a norbornene-based resin has a smaller photoelastic coefficient, a liquid crystal display exhibiting an excellent display uniformity can be obtained. Particularly preferably, the first optical element is formed of a single retardation film containing a norbornene-based resin.

Hitherto, a retardation film has not been obtained, which is a stretched film containing a norbornene-based resin and has a relationship of nx>nz>ny. This is because it is difficult for a polymer film containing a norbornene-based resin to generate a retardation value by stretching or to stretch it owing to its brittleness, as compared with other resins such as a polycarbonate resin heretofore frequently used as retardation films. Furthermore, in order to make a refractive index (nz) in the thickness direction of a film larger than one in-plane refractive index (ny), it is necessary to apply a large stress to the film and hence it becomes more difficult to produce such a retardation film. According to the invention, a retardation film which is a stretched film containing a norbornene-based resin and has a relationship of nx>nz>ny can be actually obtained by the production method using a specific shrinkable film.

In the specification, the norbornene-based resin means a polymer obtained by using a norbornene-based monomer having a norbornene ring as a partial or entire starting material (monomer). The norbornene-based resin is obtained by using as a starting material a norbornene-based monomer having a norbornene ring (having a double bond in a norbornane ring). However, the (co)polymer may or may not have a norbornane ring in a repeating unit. A norbornene-based resin as a (co)polymer having no norbornane ring is one obtained from a monomer forming a five-membered ring through ring-opening. Examples of the monomer forming a five-membered ring through ring-opening include norbornene, dicyclopentadiene, 5-phenylnorbornene, and derivatives thereof. When the norbornene-based resin is a copolymer, an arrangement of the molecule is not particularly limited and the molecule may be a random copolymer, a block copolymer, or a graft copolymer.

As the norbornene-based resin, a commercially available one may be used as it is. Alternatively, one obtained by subjecting a commercially available norbornene-based resin to any appropriate polymer modification can be also used. Examples of the commercially available norbornene-based resin include "ARTON series" manufactured by JSR Corporation (trade name: ARTON FLZR50, ARTON FLZR70, ARTON FLZR100, ARTON F5023, ARTON FX4726, ARTON FX4727, ARTON D4531, ARTON D4532, etc.), "ZEONOR series" manufactured by Zeon Corporation (trade name: ZEONOR 750R, ZEONOR 1020R, ZEONOR 1600, etc.), "APL series" manufactured by Mitsui Chemicals Inc. (APL8008T, APL6509T, APL6011T, APL6013T, APL6015T, APL5014T, etc.), and COC resin (trade name: TOPAS) manufactured by TICONA.

Examples of the norbornene-based resin include: (A) a resin obtained through hydrogenation of a ring-opened (co) polymer of a norbornene-based monomer, and (B) a resin obtained through addition (co)polymerization of a norbornene-based monomer. The ring-opened copolymer of a norbornene-based monomer includes a resin obtained through hydrogenation of a ring-opened copolymer of one or more norbornene-based monomers, and α-olefins, cycloalkenes, and/or unconjugated dienes. The resin obtained through addition copolymerization of a norbornene-based monomer includes a resin obtained through addition copolymerization of one or more norbornene-based monomers, and α-olefins, cycloalkenes, and/or unconjugated dienes. The norbornene based resin is preferably (A) a resin obtained through hydrogenation of a ring-opened (co)polymer of a norbornene-based monomer. This is because a retardation film large retardation values with low stretch magnitude can be obtained.

The resin obtained through hydrogenation of the ring-opened (co)polymer of a norbornene-based monomer can be obtained by subjecting the norbornene-based monomer or the like to a metathesis reaction to obtain a ring-opened (co) polymer and subjecting the ring-opened (co)polymer to hydrogenation. Specifically, there may be mentioned, for example, a method described in "Development and applied techniques of optical polymer materials", published by NTS Inc., p. 103 to p. 111 (2003); a method described in paragraphs [0059] and [0060] of JP-A-11-116780; a method described in paragraphs [0035] to [0037] of JP-A-2001-350017; and a method described in paragraph [0053] of JP-A-2005-008698. The resin obtained through addition (co)polymerization of a norbornene-based monomer can be obtained by a method described in Example 1 of JP-A-61-292601.

The thermoplastic resin showing positive intrinsic birefringence preferably has a weight average molecular weight (Mw) of preferably 20,000 to 500,000, more preferably 30,000 to 200,000, measured through a gel permeation chromatograph (GPC) method using a tetrahydrofuran solvent. When the weight average molecular weight falls within the above ranges, a resin having excellent mechanical strength, and favorable solubility, moldability, and operability in casting can be obtained.

A glass transition temperature (Tg) of the thermoplastic resin showing positive intrinsic birefringence is preferably from 110° C. to 185° C., more preferably from 120° C. to 170° C., and particularly preferably from 125° C. to 150° C. When Tg is 110° C. or higher, a film having a favorable thermal stability is easily obtained. When Tg is 185° C. or lower, in-plane and thickness direction retardation values are easily controlled by stretching. The glass transition temperature (Tg) can be determined by DSC method in accordance with JIS K7121.

Any appropriate forming method may be employed as a method of obtaining a polymer film containing the thermoplastic resin showing positive intrinsic birefringence as a main component. Examples of the forming method include compression molding, transfer molding, injection molding, extrusion, blow molding, powder molding, FRP molding, and solvent casting. The forming method is preferably solvent casting. This is because a polymer film excellent in smoothness and optical uniformity can be obtained.

The solvent casting is specifically a method which comprises defoaming a rich solution (dope) prepared by dissolving in a solvent a resin composition containing a resin as a main component, an additive, and the like; uniformly casting the defoamed solution into a sheet form on a surface of an endless stainless belt or rotating drum; and evaporating the solvent to form a film. The conditions for forming the film may be appropriately selected in accordance with the purpose.

The polymer film containing the thermoplastic resin showing positive intrinsic birefringence may further contain any appropriate additive. Examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, and, a thickener. A content (weight ratio) of the additive may be appropriately set depending on the purpose. Preferably, the content (weight ratio) of the additive is more than 0 and not more than 20 based on 100 of the thermoplastic resin showing positive intrinsic birefringence.

Any appropriate thickness may be selected as the thickness of the polymer film depending on the mechanical strength and retardation values designed. The thickness of the polymer film is usually 20 μm to 200 μm. A thickness of the film within the above ranges may provide a polymer film having excellent mechanical strength and exhibiting the optical properties described in the above-mentioned section D-1.

As the polymer film containing a thermoplastic resin showing positive intrinsic birefringence, a commercially available film may be used as it is. Alternatively, one obtained by subjecting a commercially available film to a secondary processing such as stretching and/or shrinking treatment can be also used. Examples of the commercially available polymer film containing a norbornene-based resin include "ARTON series" manufactured by JSR Corporation (trade name: ARTON F, ARTON A, ARTON D) and "ZEONOR series" manufactured by Optes Inc. (trade name: ZEONOR ZF14, ZFONOR ZF6).

The retardation-film used for the first optical element may be obtained by, for example, attaching shrinkable films on both sides of a polymer film containing a thermoplastic resin showing positive intrinsic birefringence and heat stretching the resultant through a vertical uniaxial stretching method using a roll stretching machine. The shrinkable film is used for providing shrinkage force in a direction perpendicular to a stretching direction during heat stretching, and for increasing a refractive index (nz) in the thickness direction. As a method of attaching the shrinkable films to both sides of the polymer film, any appropriate method may be employed. However, a method wherein the polymer film and the shrinkable film are bonded by providing an acrylic pressure sensitive adhesive layer containing an acrylic polymer as a base polymer therebetween is preferable from the viewpoints of excellent productivity, workability and economical efficiency.

Figure 4:
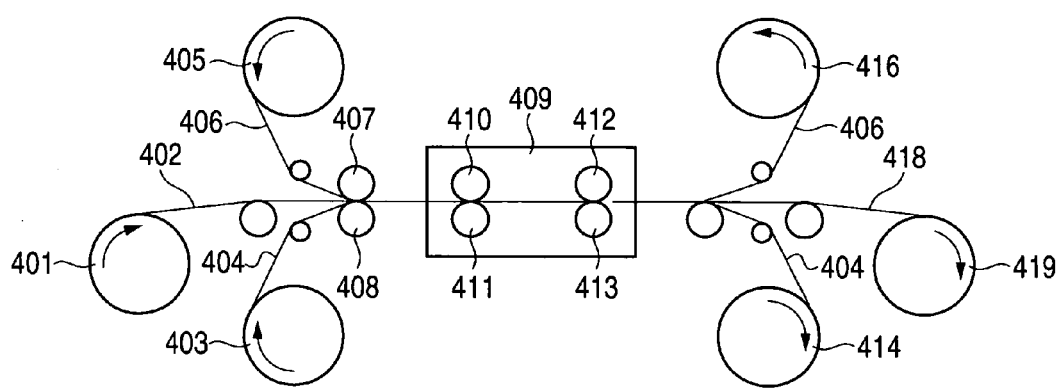
FIG. 4 is a schematic diagram showing a concept of a typical production process of a first optical element used in the invention.

An example of a method of producing the retardation film will be described with reference to FIG. 4. FIG. 4 is a schematic diagram showing a concept of a typical production process of the retardation film used for the first optical element. For example, a polymer film 402 containing a thermoplastic resin showing positive intrinsic birefringence is delivered from a first delivery part 401. A shrinkable film 404 comprising a pressure sensitive adhesive layer and delivered from a second delivery part 403, and a shrinkable film 406 comprising a pressure sensitive adhesive layer and delivered from a third delivery part 405 are attached to both sides of the polymer film 402 by laminate rollers 407 and 408. The polymer film having the shrinkable films attached to both sides is subjected to stretching treatment while being maintained at a constant temperature by a heating means 409 under tension in a machine direction of the film by rollers 410, 411, 412, and 413 at different speed ratios (under tension in the thickness direction by the shrinkable films at the same time). The shrinkable films 404 and 406 together with the pressure sensitive adhesive layers are peeled of from a stretched film 418 at a first winding part 414 and a second winding part 415, and the stretched film 418 is taken-up at a third winding part 419.

The shrinkable film is preferably a stretched film such as a biaxially stretched film or a uniaxially stretched film. The shrinkable film can be obtained by forming an unstretched film into a sheet form through an extrusion method and stretching the unstretched film in a machine and/or transverse direction at a predetermined stretch ratio using a simultaneous biaxial stretching machine or the like. The forming and stretching conditions may be appropriately selected in accordance with the compositions or kinds of resins to be used and the purpose.

Examples of a material used for the shrinkable film include polyesters, polystyrene, polyethylene, polypropylene, polyvinyl chloride, and polyvinylidene chloride. Preferably, the shrinkable film is a biaxially stretched film containing polypropylene. Since such a shrinkable film is excellent in shrinkage uniformity and thermal resistance, aimed retardation values may be obtained and also a retardation film excellent in optical uniformity may be obtained.

In one embodiment, preferably, the shrinkable film has a shrinkage ratio $S^{140}[MD]$ of 4.5 to 7.7% in a machine direction of the film at 140° C., and a shrinkage ratio $S^{140}[TD]$ of 8.1 to 15.4% in a transverse direction of the film at 140° C. More preferably, the shrinkable film has $S^{140}[MD]$ of 5.1 to 7.7% and $S^{140}[TD]$ of 10.2 to 15.4%.

In another embodiment, preferably, the shrinkable film has a shrinkage ratio $S^{160}[MD]$ of preferably 14.4 to 23.5% in a machine direction of the film at 160° C., and a shrinkage $S^{160}[TD]$ of preferably 28.5 to 54.6% ratio in a transverse direction of the film at 160° C. More preferably, the shrinkable film has $S^{160}[MD]$ of 15.7 to 23.5% and $S^{160}[TD]$ of 36.4 to 54.6%. The shrinkage ratios of the shrinkable film at each temperature within the above ranges may provide a retardation film having intended retardation values and excellent uniformity.

In one embodiment, a difference $\Delta S^{140}=S^{140}[TD]-S^{140}[MD]$ between the shrinkage ratio in a transverse direction of the shrinkable film and the shrinkage ratio in a machine direction of the film at 140° C. is preferably from 1.5 to 7.7%, more preferably from 5.1 to 7.7%. In another embodiment, a difference $\Delta S^{160}=S^{160}[TD]-S^{160}[MD]$ between the shrinkage ratio in a transverse direction of the shrinkable film and the shrinkage ratio in a machine direction of the film at 160° C. is preferably from 14.1 to 31.1%, more preferably from 20.7 to 31.1%. A large shrinkage ratio in an MD direction may cause difficulties in uniform stretching due to shrinkage force of the retardation film on a stretching machine, in addition to stretching tension. A difference within the above ranges allows uniform stretching without applying excess load to facilities such as a stretching machine.

The shrinkable film has a shrinkage stress in a transverse direction $T^{140}[TD]$ of preferably 0.36 to 0.80 N/2 mm, more preferably 0.50 to 0.80 N/2 mm at 140° C. The shrinkable film has a shrinkage stress in a transverse direction $T^{150}[TD]$ of preferably 0.44 to 0.90 N/2 mm, more preferably 0.60 to 0.90 N/2 mm at 150° C. A shrinkage stress within the above ranges may provide a retardation film having intended retardation values and excellent optical uniformity.

The shrinkage ratios S[MD] and S[TD] can be determined in accordance with a heat shrinkage ratio A method of JIS Z1712-1997 (except that a heating temperature is changed from 120° C. to 140° C. (or 160° C.) and a load of 3 g is added to a sample piece). Specifically, five samples having a width of 20 mm and a length of 150 mm are sampled from a machine direction (MD) and a transverse direction (TD), respectively. The sample pieces are each marked at a distance of about 100 mm at a center. The sample pieces each with a load of 3 g are hung vertically in an air-circulating thermostatic bath maintained at 140° C.±3° C. (or 160° C.±3° C.). The sample pieces are heated for 15 min, taken out of the thermostatic bath, and left standing under standard conditions (room temperature) for 30 min. Then, the distances between the marks are measured using a caliper in accordance with JIS B7507, to thereby obtain an average of five measured values. A shrinkage ratio can be calculated from an equation: S (%)=[(distance between marks (mm) before heating−distance between marks (mm) after heating)/distance between marks (mm) before heating]×100.

A commercially available shrinkable film used for applications such as general packaging, food packing, pallet wrapping, shrinkable labels, cap seals, and electrical insulation can be appropriately selected and used as the above-described shrinkable film as long as the purpose of the invention can be satisfied. The commercially available shrinkable film may be used as it is, or may be used after the shrinkable film is subjected to secondary processing such as stretching treatment or shrinking treatment. Examples of the commercially available shrinkable film include: "ALPHAN series" (trade name: ALPHAN P, ALPHAN S, ALPHAN H etc.) manufactured by Oji paper Co., Ltd.; "FANCYTOP series" (trade name: FANCYTOP EPI, FANCYTOP EP2, etc.) manufactured by Gunze Ltd.; "TORAYFAN BO series" (trade name: 2570, 2873, 2500, 2554, M114, M304, etc.) manufactured by Toray Industries, Inc.; "SUN-TOX-OP series" (trade name: PA20, PA21, PA30, etc.) manufactured by SUN-TOX Co., Ltd.); and "TOHCELLO OP series" (trade name: OPU-0, OPU-1, OPU-2, etc.) manufactured by TOHCELLO Co., Ltd.

A temperature inside a stretching oven (also referred to as stretching temperature) during heat stretching of a laminate of the polymer film containing a thermoplastic resin showing positive intrinsic birefringence, and the shrinkable film may be appropriately selected in accordance with the intended retardation values, the kind or thickness of the polymer film used, and the like. The stretching temperature is preferably from Tg+1° C. to Tg+30° C., where Tg represents a glass transition temperature of the polymer film. The use of the above-mentioned temperature range allows easy achievement of homogeneous retardation values of the retardation film and also the film hardly crystallizes (becomes clouded). Specifically, the stretching temperature is usually 110° C. to 185° C. The glass transition temperature (Tg) can be determined by DSC method in accordance with JIS K7121-1987.

A stretching ratio (stretch ratio) during stretching of a laminate of the polymer film containing a thermoplastic resin showing positive intrinsic birefringence, and the shrinkable film may be appropriately selected in accordance with the intended retardation values, the kind or thickness of the polymer film used, and the like. Specifically, the stretch ratio is more than 1 time and not more than 2 times. A delivery speed during stretching is usually from 1 m/min to 20 m/min in consideration of the machine accuracy, stability, and the like of the stretching machine. The above-mentioned stretching conditions may provide a retardation film not only satisfying the optical properties described in the above-mentioned section D-1 but also having excellent optical uniformity.

E. Second Optical Element

In one embodiment, the liquid crystal panel to be used in the liquid crystal display of the invention further contains a second optical element between the first polarizer and the first optical element. The optical indicatrix of the second optical element has a relationship of nx=ny>nz, wherein nm, ny and nz are a refractive index in the slow axis direction, a refractive index in the fast axis direction, and a refractive index in the thickness direction, respectively. Ideally, the optical element wherein the optical indicatrix has a relationship of nx=ny>nz has an optical axis in a normal line direction. In the specification, nx=ny includes not only a case where nx and ny are perfectly equal, but also a case where nx and ny are substantially equal. A phrase "a case where nx and ny are substantially equal" includes a case where an in-plane retardation value (Re[550] is less than 10 nm. In this regard, when the optical indicatrix: the relationship of nx=ny>nz is expressed by Re[550] and Rth[550], the second optical element satisfies the following expressions (4) and (5).

$$Re[550]<10 \text{ nm} \qquad (4)$$

$$10 \text{ nm} \leq Rth[550] \qquad (5)$$

wherein Re[550] and Rth[550] are an in-plane retardation value and a thicknesswise retardation value measured at 23° C. with light having a wavelength of 550 nm, respectively.

In the invention, the second optical element is used together with the first optical element for reducing light leak in an oblique direction of a liquid crystal display. In the liquid crystal display of the invention, by using the first optical element having a specific relationship of optical indicatrix, the light leak can be reduced and, as a result, a liquid crystal display exhibiting a high contrast ratio in an oblique direction may be obtained.

Figure 5A:
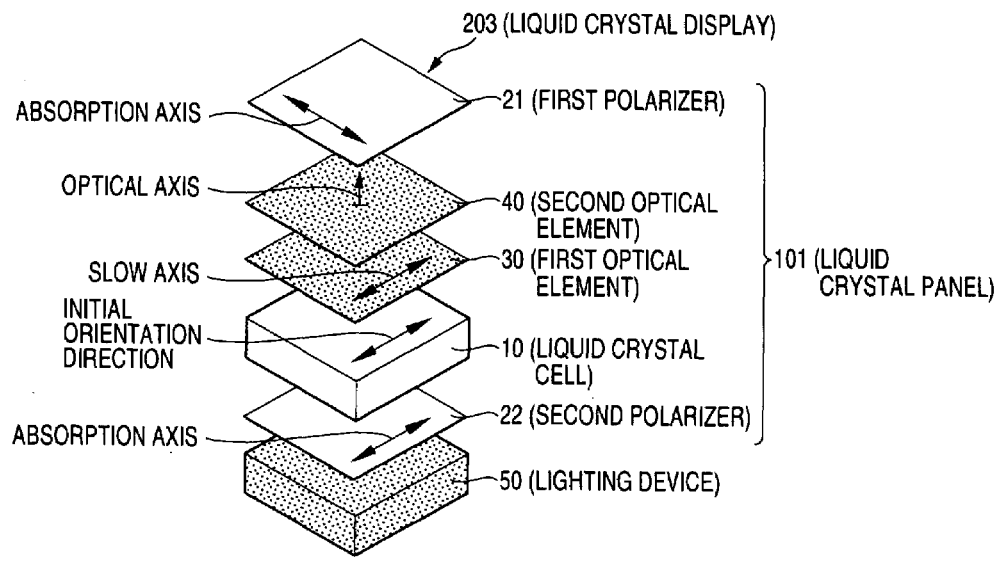
FIG. 5 is a schematic perspective view of a liquid crystal display according to a preferred embodiment employing a second optical element in the invention.
Figure 5B:
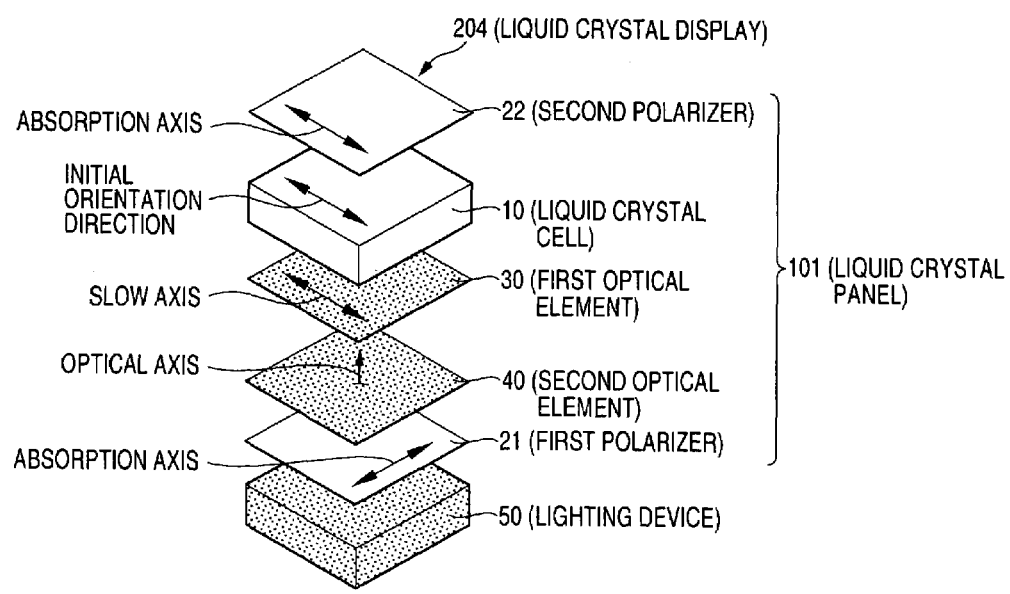

FIG. 5 is a schematic sectional view of a liquid crystal display according to a preferred embodiment when the second optical element is used in the invention. FIG. 5A is a schematic perspective view of the liquid crystal employing O-mode, and FIG. 5B is a schematic perspective view of the liquid crystal employing E-mode. Note that, a ratio among length, width, and thickness of each member in FIG. 5A and FIG. 5B is different from that of an actual member for clarity.

The liquid crystal display 203 (or 204) comprises a liquid crystal panel 101 and a lighting device 50 arranged on one side of the liquid crystal panel 101. The liquid crystal panel 101 contains a liquid crystal cell 10, a first polarizer 21 arranged on one side of the liquid crystal cell 10, a second polarizer 22 arranged on the other side of the liquid crystal cell 10, a first optical element 30 arranged between the liquid crystal cell 10 and the first polarizer 21, and a second optical element 40 arranged between the first polarizer 21 and the first optical element 30. The absorption axis direction of the first polarizer 21 is substantially perpendicular to the absorption axis direction of the second polarizer 22. The optical indicatrix of the first optical element 30 has a relationship of nx≧nz>ny. The optical indicatrix of the second optical element 40 has a relationship of nx=ny>nz. The lighting device 50 has a maximum luminance in the wavelength range of 550±50 nm and relative luminance at wavelength of 450 nm is 0.28 or less. In this regard, the relative luminance is luminance when the maximum luminance is regarded as 1 and nx, ny and nz are a refractive index in the slow axis direction, a refractive index in the fast axis direction, and a refractive index in the thickness direction, respectively.

Referring to FIGS. 5A and 5B, the second optical element 40 is arranged between the first polarizer 21 and the first optical element 30. In the case where nx and ny are perfectly equal, the second optical element does not generate an in-plane retardation value, so that the slow axis is not detected. In this case, the second optical element 40 may be arranged irrelevantly to the absorption axis direction of the first polarizer 21 and the slow axis direction of the first optical element 30. Even when nx and ny are substantially equal, the slow axis is sometimes detected (an in-plane retardation value is slightly generated) in the case where nx and ny are different from each other. In this case, preferably, the second optical element 40 is arranged such that the slow axis direction thereof is substantially parallel or perpendicular to the absorption axis direction of the first polarizer 21. In the specification of the invention, the phrase "substantially parallel" includes a case where the slow axis direction of the second optical element 40 and the absorption axis of the first polarizer 21 form an angle of 0°±2.0°, preferably 0°±1.0°, and more preferably 0°±0.5°. Moreover, the phrase "substantially perpendicular" includes a case where the slow axis direction of the second optical element 40 and the absorption axis of the first polarizer 21 form an angle of 90°±2.0°, preferably 90°±1.0°, and more preferably 90°±0.5°. The smaller deviation in angle between the slow axis direction of the second optical element and the absorption axis of the first polarizer may provide a liquid crystal display having a smaller light leak in front and oblique directions.

E-1. Optical Properties of Second Optical Element

Re[550] of the second optical element is preferably less than 10 nm, more preferably 8 nm or less, and still more preferably 5 nm or less, Re[550] within the above range may provide a liquid crystal display having a small light leak and color change (color shift) in all azimuth directions, i.e., 360° when a display displaying a black image is viewed in an oblique direction.

Rth[550] of the second optical element is preferably 10 nm or more, more preferably from 20 to 180 nm, still more preferably from 30 to 150 nm, and particularly preferably from 30 nm to 120 nm. Rth[550] within the above range may provide a liquid crystal display having a small light leak and color change (color shift) in all azimuth directions, i.e., 360° when a display displaying a black image is viewed in an oblique direction.

E-2. Means for Arranging First Optical Element

Referring to FIG. 5, any appropriate method may be employed as a method of arranging the second optical element 40 depending on the purpose. Preferably, an adhesive layer (not shown) is provided between the second optical element 40 and the first optical element 30 and between the second optical element 40 and the first polarizer 21, and respective optical members are adhered to each other. Thus, a gap between the optical elements is filled with the adhesive layer, to thereby prevent shift in relationship among optical axes of the respective optical elements and damages of the optical elements through abrasion to each other when the optical elements are incorporated into a liquid crystal display. Furthermore, adverse effects caused by interface reflection and refraction between layers of optical elements may be reduced, so that a liquid crystal display capable of displaying a bright image can be obtained A thickness of the adhesive layer may be appropriately selected in accordance with the purpose. The thickness of the adhesive layer is usually from 0.1 μm to 50 μm. The thickness of the adhesive layer within the above range may provide an optical element and polarizer to be adhered without detachment or exfoliation and result in an adhesive force and adhesive time which practically do not adversely affect. As a material for forming the adhesive layer, any appropriate one may be selected among those exemplified in the above-mentioned sections C-2 and D-2.

E-3. Structure of Second Optical Element

A structure (laminate structure) of the second optical element is not particularly limited as long as the second optical element satisfies the optical properties described in the above-mentioned section E-1. Specifically, the second optical element may be a single retardation film, or a laminate of two or more retardation film. The second optical element is preferably a single retardation film. The use of a single retardation film may provide a thin liquid crystal display. The second optical element as a laminate may include an adhesive layer. When the second optical element as a laminate includes two or more retardation films, the retardation films may be identical to or different from each other. Details of the retardation film will be described in the section E-4 below.

Rth[550] of the retardation film used for the second optical element can be appropriately selected in accordance with the number of retardation films used. For example, when the second optical element is formed of a single retardation film, Rth[550] of the retardation film is preferably equal to Rth[550] of the second optical element. Thus, a retardation value of an adhesive layer used for lamination of the second optical element on the polarizer is preferably as small as possible. Furthermore, when the second optical element is a laminate including two or more retardation films, for example, total Rth[550] of the retardation films is preferably designed to be equal to Rth[550] of the second optical element.

Specifically, the second optical element having Rth[550] of 60 nm can be obtained by laminating two retardation films each having Rth[550] of 30 nm. Alternatively, it can be obtained by laminating a retardation film having Rth[550] of 10 nm and a retardation film having Rth[550] of 50 nm. The present specification describes the cases each employing two or less retardation films for simplicity, but the present invention may obviously be applied to a laminate including three or more retardation films.

A total thickness of the second optical element is usually 20 μm to 200 μm although the thickness may vary depending on the structure.

E-4. Retardation Film Used for Second Optical Element

As the retardation film used for the second optical element, any appropriate one may be employed, but a retardation film preferably used has excellent transparency, mechanical strength, thermal stability, water barrier property, and the like and hardly causes optical unevenness due to distortion.

The thickness of the retardation film may vary depending on the number of fins to be laminated. Typically, the thickness of the retardation film is determined such that the total thickness of the second optical element becomes preferably 20 μm to 200 μm. For example, when the second optical element is formed of a single retardation film, the thickness of the retardation film is preferably from 20 μm to 200 μm, which is equal to the total thickness of the second optical element. For example, when the second optical element is a laminate of two retardation films, the thickness of each retardation film may be any appropriate one as long as the total thickness thereof is equal to the preferable total thickness of the second optical element. Thus, the thickness of each retardation film may be the same or different from each other. In one embodiment wherein two retardation films are laminated, the thickness of one retardation film is preferably from 10 μm to 100 μm.

A transmittance of the retardation film measured at 23° C. with light having a wavelength of 550 nm is usually 80% or more, and preferably 90% or more. In this regard, the second optical element also preferably has a similar light transmittance. A theoretical upper limit of the transmittance is 100% and a feasible upper limit is 96%.

An absolute value of photoelastic coefficient of the retardation film ($C[550](m^2/N)$) is preferably $1 \times 10^{-12}$ to $100 \times 10^{-12}$, more preferably $1 \times 10^{-12}$ to $80 \times 10^{-12}$, and most preferably $1 \times 10^{-12}$ to $60 \times 10^{-12}$. Use of a retardation film having an absolute value of photoelastic coefficient within the above range may provide a liquid crystal display exhibiting an excellent display uniformity.

The second optical element to be used in the invention preferably contains a retardation film containing a cellulose-based resin. The retardation film may be a stretched film or an unstretched film.

Any appropriate cellulose-based resin may be employed as the cellulose-based resin. The cellulose-based resin is preferably a cellulose organic acid ester or a cellulose mixed organic acid ester in which hydroxyl groups of cellulose are substituted partly or entirely by an acetyl group, a propionyl group and/or a butyroyl group. Examples of the cellulose organic acid ester include cellulose acetate, cellulose propionate, and cellulose butyrate. Examples of the cellulose mixed organic acid ester include cellulose acetate propionate, and cellulose acetate butyrate. The cellulose ester is produced, for example, through a method described in paragraphs [0040] and [0041] of JP-A-2001-188.

As the cellulose-based resin, a commercially available one may be used as it is. Alternatively, the resin may be used after having been subjected to any appropriate polymer modification. Examples of the polymer modification include copolymerization, cross-lining, a molecular terminal modification, and stereoregularity modification. Examples of the commercially available cellulose-based resin include cellulose acetate propionate resins (trade name: 307E-09, 360A-09, 360E-16) manufactured by Daicel Fine Chemical Co., Ltd.; cellulose acetate (trade name: CA-398-30, CA-398-30L, CA-320S, CA-394-60S, CA-398-10, CA-398-3, CA-398-30, CA-398-6) manufactured by EASTMAN; cellulose butyrate (trade name: CAB-381-0.1, CAB-381-20, CAB-500-5, CAB-531-1, CAB-551-0.2, CAB-553-0.4) manufactured by EASTMAN; and cellulose propionate (trade name: CAP-482-0.5, CAP-482-20, CAP-504-0.2) manufactured by EASTMAN.

The cellulose ester has a weight average molecular weight (Mw) of preferably 20,000 to 1,000,000, more preferably 25,000 to 800,000, particularly preferably 30,000 to 400,000, and most preferably 40,000 to 200,000. When the weight average molecular weight falls within the above ranges, a resin having excellent mechanical strength, and favorable solubility, moldability, and operability in casting can be obtained.

A glass transition temperature (Tg) of the cellulose-based resin is preferably from 110° C. to 185° C., more preferably from 120° C. to 170° C., and particularly preferably from 125° C. to 150° C. When Tg is 110° C. or higher; a film having a favorable thermal stability is easily obtained. When Tg is 185° C. or lower, forming ability is excellent. The glass transition temperature (Tg) can be determined by DSC method in accordance with JIS K7121.

Any appropriate forming method may be employed as a method of obtaining a retardation film containing the cellulose-based resin. Examples of the forming method include compression molding, transfer molding, injection molding, extrusion, blow molding, powder molding, FRP molding, and solvent casting. The forming method is preferably solvent casting. This is because a polymer film excellent in smoothness and optical uniformity can be obtained.

The polymer film containing the cellulose-based resin may further contain any appropriate additive. Examples of the additive include a plasticizer, a thermal stabilizer, a light stabilizer, a lubricant, an antioxidant, a UV absorber, a flame retardant, a colorant, an antistatic agent, a compatibilizing agent, a crosslinking agent, and, a thickener. A content (weight ratio) of the additive may be appropriately set depending on the purpose. Preferably, the content (weight ratio) of the additive is more than 0 and not more than 20 based on 100 of the cellulose-based resin.

Any appropriate thickness may be selected as the thickness of the polymer film depending on the mechanical strength and retardation values designed. The thickness of the polymer film is usually 20 μm to 200 μm. A thickness of the film within the above ranges may provide a polymer film having excellent mechanical strength and exhibiting the optical properties described in the above-mentioned section E-1.

As the retardation film containing a cellulose-based resin, a commercially available film may be used as it is. Alternatively, one obtained by subjecting a commercially available film to a secondary processing such as stretching and/or shrinking treatment can be also used. Examples of the commercially available polymer film containing a cellulose-based resin include "FUJITAC series" (trade name: ZRF80S, TD80UF, TDY-80UL) manufactured by Fuji Photo Film Co., Ltd. and trade name "KC8UX2M" manufactured by Konica Minolta Opto K.K.

F. Lighting Device

The liquid crystal display of the invention comprises a liquid crystal panel and a lighting device arranged on one side of the liquid crystal panel. The above lighting device has a maximum value of luminance (maximum luminance) in the wavelength range of 550±50 nm, and a relative luminance at the wavelength of 450 nm is 0.28 or less. The relative luminance at the wavelength of 450 nm of the lighting device is preferably 0.05 to 0.28, more preferably from 0.08 to 0.25, particularly preferably from 0.10 to 0.22, and most preferably from 0.10 to 0.18. The relative luminance herein is luminance when the maximum luminance is regarded as 1 and nx, ny and nz are a refractive index in the slow axis direction, a refractive index in the fast axis direction, and a refractive index in the thickness direction, respectively. By using a lighting device having such specific maximum luminance and relative luminance, a liquid crystal display having a small light leak and color change (color shift) in all azimuth directions, i.e., 360° can be obtained when a display displaying a black image is viewed in an oblique direction.

The lighting device has a maximum value of relative luminance of preferably 0.05 to 0.28, more preferably 0.08 to 0.25, particularly preferably 0.10 to 0.22, and most preferably 0.10 to 0.18 in the wavelength range of 450±50 nm. The relative luminance of the lighting device within the above range may provide a liquid crystal display having a small light leak and color change (color shift) in all azimuth directions, i.e., 360° when a display displaying a black image is viewed in an oblique direction.

Furthermore, the lighting device has a maximum value of relative luminance of preferably 0.14 to 0.56, more preferably 0.18 to 0.38, and particularly preferably 0.20 to 0.30 in the wavelength range of 650±50 nm. The relative luminance of the lighting device within the above range may provide a liquid crystal display having a small light leak and color change (color shift) in all azimuth directions, i.e., 360° when a display displaying a black image is viewed in an oblique direction.

The lighting device may be a transmission-type wherein the display is viewed by irradiation with light from backside of the liquid crystal panel or may be a reflection-type wherein the display is viewed by irradiation with light from viewer side of the liquid crystal panel. Alternatively, the liquid crystal display may be a semi-transmission-type which has both natures of the transmission-type and the reflection-type. Preferably, the liquid crystal display of the invention is a transmission-type. This is because a liquid crystal display exhibiting a small light leak in an oblique direction can be obtained.

As the lighting device, one having any appropriate structure may be employed. As the structure of the lighting device, there may be typically mentioned a "direct-type" wherein light is applied from just under the liquid crystal panel and an "edge light-type" wherein light is applied from side edge of the liquid crystal panel. Preferably, the structure of the lighting device is a direct-type. This is because high luminance is obtained by the lighting device of direct-type.

The lighting device is preferably arranged on a side opposite to the viewer side of the liquid crystal cell. Referring to FIGS. 2A and 2B, in the case of O-mode liquid crystal panel, the lighting device 50 is arranged on a side of the second polarizer 22 opposite to the side provided with the liquid crystal cell 10. In the case of mode liquid crystal panel, the lighting device 50 is preferably arranged on a side of the first polarizer 21 opposite to the side provided with the first optical element 30 and the liquid crystal cell 10.

Figure 6A:
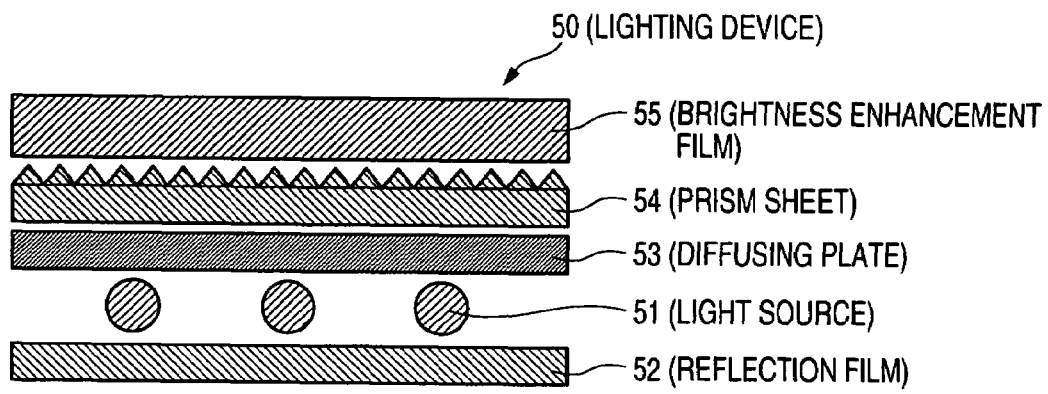
FIG. 6 is a schematic sectional view showing one example of a lighting device used in the invention.
Figure 6B:
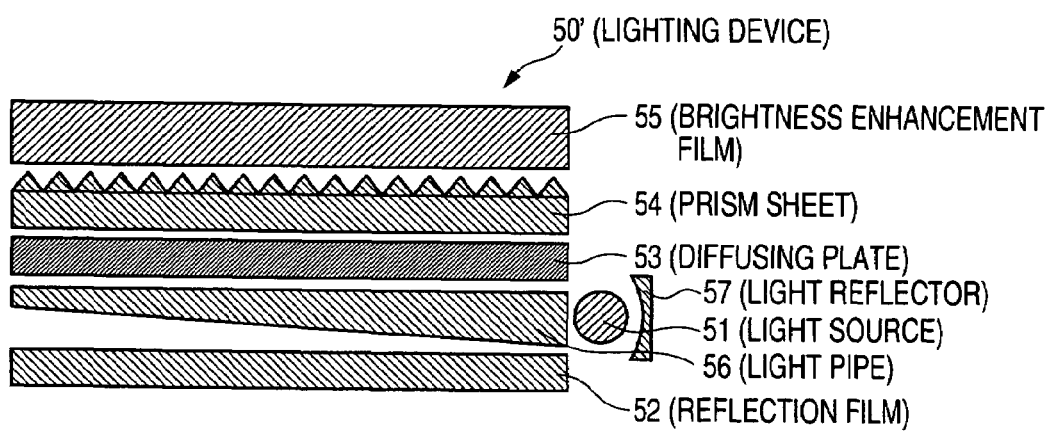

FIGS. 6A and 6B are a schematic sectional view showing one example of a lighting device used in the invention. FIG. 6A is a sectional view when the "direct-type" is employed for the lighting device. FIG. 6B is a sectional view when the "edge light-type" is employed for the lighting device. Note that, a ratio among length, width, and thickness of each member in FIG. 6A and FIG. 6B is different from that of an actual member. When the "direct-type" is employed for the lighting device, the lighting device 50 preferably comprises a light source 51, a reflection film 52, a diffusion plate 53, and a prism sheet 54. More preferably, the lighting device 50 either comprises a brightness enhancement film 55 on a side of the prism sheet 54 opposite to the side at which the diffusion plate 53 is arranged. When the "edge light-type" is employed for the lighting device, the lighting device 50' at least further comprises a light pipe 56 and a light reflector 57 in addition to the above constitution.

As the light source, any appropriate one may be employed. The light source is preferably a cold-cathode fluorescent tube (CCFL), a light emitting diode (LED), an organic EL (OLED), or a field emission element (FED). The light source is more preferably a cold-cathode fluorescent tube (CCFL) or a light emitting diode (LED). In this regard, the number of the light source used in the liquid crystal display of the invention is appropriately selected depending on the size of the liquid crystal panel and the mode of the lighting device.

When the cold-cathode fluorescent tube (CCFL) is employed as the light source, any appropriate one may be selected as the cold-cathode fluorescent tube. The cold-cathode fluorescent tube comprises a glass tube whose inner wall is coated with a fluorescent substance and electrodes attached to both ends of the glass tube. Rare gas such as argon and mercury are usually included in the glass tube. Preferably, the cold-cathode fluorescent tube is a three-wavelength region emission fluorescent lamp. The three-wavelength region emission fluorescent lamp preferably include a red fluorescent substance having a bright line spectrum at a wavelength of 600 to 650 nm, a green fluorescent substance having a bright line spectrum at a wavelength of 520 to 560 nm, and a blue fluorescent substance having a bright line spectrum at a wavelength of 400 to 500 nm. Such a three-wavelength region emission fluorescent lamp has advantages that it works at a low current, a heat release value is small, and it has a long life.

The cold-cathode fluorescent tube having a maximum luminance and relative luminance of the above requirements can be obtained by appropriately adjusting the amounts of respective color fluorescent substances. The respective color fluorescent substances may be used singly or as an appropriate mixture of two or more materials having different bright line spectra. As the fluorescent substance, any appropriate material may be used. Examples of the red fluorescent substance include $Y_2O_3$:Eu and $(Y,Gd)O_3$:Eu. Examples of the green fluorescent substance include $LaPO_4$:Ce,Tb, $MgAl_{11}O_{19}$:Ce:Tb,Mn, $BaMg_2Al_{16}O_{27}$:Eu,Mn, $Y_2SiO_5$:Ce, Tb, $Zn_2SiO_4$:Mn, ZnS:Cu,Al, and $Gd_2O_2S$:Tb. Examples of the blue fluorescent substance include $BaMg_2Al_{10}O_{17}$:Eu, ZnS:Ag,Al, $(SrCaBaMg)_5(PO_4)_3Cl$:Eu, $BaMgAl_{10}O_{17}$:Eu, $CaWO_4$, $Sr_{10}(PO_4)_6C_{12}$:Eu, $Ca_{10}(PO_4)_6C_{12}$:Eu, $Sr_{10}(PO_4)_6B_2O_3$:Eu, and $Ca_{10}(PO_4)_6B_2O_3$:Eu. Preferably, the cold-cathode fluorescent tube at lest contains a green fluorescent substance: $LaPO_4$:Ce,Tb, a blue fluorescent substance: $BaMg_2Al_{10}O_{17}$:Eu, and a red fluorescent substance: $Y_2O_3$:Eu.

Moreover, as the cold-cathode fluorescent tube, a commercially available one may be used as it is. Examples of the commercially available cold-cathode fluorescent tube include a cold-cathode fluorescent lamp series (straight-tube N type, L-shaped T type, horseshoe-shaped T type, etc.) manufactured by West Electric Co., Ltd.

When the light emitting diode (LED) is employed as the light source, any appropriate one may be selected as the light emitting diode. As the lighting device, a white light emitting diode (white LED) may be used or two or more light emitting diodes (e.g., red LED, blue LED, and green LED, etc.) may be appropriately combined and used. The light emitting diode wherein the maximum luminance and relative luminance satisfy the above requirements can be obtained by appropriately controlling the kind (color) of the light emitting diode and light emission intensity of each color. In this regard, as a method for controlling the light emission intensity of the light emitting diode, a method by an electric current value and a method by pulse width modulation may be typically mentioned.

As the light emitting diode (LED), a commercially available one can be used as it is. Examples of the commercially available white light emitting diode include InGaN white LED (trade name: SELU1WA65CMKT, SELU2WA10C, etc.) manufactured by Sanken Electric Co., Ltd. Examples of the commercially available red light emitting diode include SEC1001 series (trade name: SEC1201C (peak wavelength 630 nm), SEC1101C (peak wavelength 700 nm), SEC1801C (peak wavelength 610 nm)) manufactured by Sanken Electric Co., Ltd. Examples of the commercially available green light emitting diode include SEC1001 series (trade name: SEC1501C (peak wavelength 555 nm), SEC1401C (peak wavelength 560 nm), SECU1D01C (peak wavelength 525 nm)) manufactured by Sanken Electric Co., Ltd. Examples of the commercially available blue light emitting diode include SEC1001 series (trade name: SEC1E01C (peak wavelength 430 nm), SECU1E01C (peak wavelength 470 nm)) manufactured by Sanken Electric Co., Ltd.

As the lighting device, a commercially available one can be used as it is. Moreover, the commercially available lighting device may be also used in combination with any appropriate color-controlling filter. As the lighting device wherein the maximum luminance and relative luminance satisfy the above requirements, a trade name "LIGHT-BOX 35H for professional use" manufactured by ARGO Corporation may be mentioned, for example.

The reflection film is used for preventing light from passing through the liquid crystal panel to a side opposite to the viewer side and further for efficiently applying light from the light source into a light pipe. As the reflection film, a silver-deposited polyethylene terephthalate film and a laminate film where a polyester-based resin is laminated into a multilayer are used, for example. A reflection ratio of the reflection film is preferably 90% or more over a whole wavelength region of 410 to 800 nm. A thickness of the reflection film is usually from 50 to 200 μm. As the reflection film, a commercially available reflection film may be used as it is. Examples of the reflection film include Refwhite series manufactured by KIMOTO Co., Ltd. and Vikuiti ESR series manufactured by Sumitomo 3M Ltd.

The diffusion plate is used for introducing the light from the light pipe into a wide angle to lighten the display uniformly. As the diffusion plate, a polymer film subjected to roughening treatment and a polymer film containing a diffusing agent may be used. Haze of the diffusion plate is preferably from 85 to 92%. Furthermore, total light transmittance of the diffusion plate is preferably 90% or more. As the diffusion plate, a commercially available diffusion plate may be used as it is. Examples of the diffusion plate include OPLUS series manufactured by Keiwa Co., Ltd. and Light-Up series manufactured by KIMOTO Co., Ltd.

The prism sheet is used for condensing the light wide-angled by the light pipe into a specific direction to enhance luminance of the liquid crystal display in a front direction. As the prism sheet, one obtained by laminating a prism layer formed of an acrylic resin or a photosensitive resin on a surface of a base film formed of a polyester-based resin may be used. As the prism sheet, a commercially available prism sheet may be used as it is. Examples of the prism sheet include Dia-Art series manufactured by Mitsubishi Rayon Co., Ltd.

The brightness enhancement film is used for enhancing luminance of the liquid crystal display in front and oblique directions. As the brightness enhancement film, a commercially available brightness enhancement film may be used as it is. Examples of the brightness enhancement film include NIPOCS PCF series manufactured by Nitto Denko Corporation and Vikuiti DBEF series manufactured by Sumitomo 3M Ltd.

The light pipe is used for delivering the light from the light source all over the display. Examples of the light pipe include an acrylic resin, a polycarbonate-based resin, and a cycloolefin-based resin which are formed into tapered forms such that the thickness decreases as the plate goes away from the light source.

G. Display Characteristics of Liquid Crystal Display of the Invention

A maximum value of Y value in all azimuth directions (0° to 360°) at a polar angle of 60° in the case of displaying a black image in the liquid crystal display of the invention is preferably 1.1 or less, more preferably 0.7 or less, and particularly preferably 0.4 or less. The Y value is a three-stimulation value Y defined in CIE1931XYZ display system. A theoretical lower limit of the Y value is 0.

An average value of Y value in all azimuth directions (0° to 360°) at a polar angle of 60° in the case of displaying a black image in the liquid crystal display of the invention is preferably 0.6 or less, more preferably 0.4 or less, and particularly preferably 0.2 or less. The Y value within the above range may provide a liquid crystal display having a small light leak in an oblique direction when a black image is displayed. As a result, a liquid crystal display exhibiting a high contrast ratio can be obtained.

A maximum value of color shift ($\Delta a^*b^*$) in all azimuth directions (0° to 360°) at a polar angle of 60° in the case of displaying a black image in the liquid crystal display of the invention is preferably 12 or less, more preferably 10 or less, particularly preferably 8 or less, and most preferably 5 or less. The $\Delta a^*b^*$ is a value calculated from the expression: $\{(a^*)^2+(b^*)^2\}^{1/2}$ wherein $a^*$ and $b^*$ are color coordinates defined in CIE1976L*a*b* color space. A theoretical lower limit of the $\Delta a^*b^*$ is 0. In this regard, a lower limit of the $\Delta a^*b^*$ is 0.

Furthermore, an average value of color shift ($\Delta a^*b^*$) in all azimuth directions (0° to 360°) at a polar angle of 60° in the case of displaying a black image in the liquid crystal display of the invention is preferably 7 or less, more preferably 5 or less, particularly preferably 3 or less, and most preferably 2 or less. The smaller maximum value and average value of the $\Delta a^*b^*$ may provide a liquid crystal display exhibiting a smaller color change with viewing field of the display.

H. Application of Liquid Crystal Display of the Invention

The liquid crystal display of the invention may be used for any appropriate applications. The applications include office automation (OA) devices such as a personal computer monitor, a notebook-size personal computer, and a copying machine; portable devices such as a cellular phone, a watch, a digital camera, a personal digital assistance (PDA), and a portable game machine; home appliances such as a video camera, a television, and a microwave; in-car devices such as a back monitor, a car navigation system monitor, and a car audio; display devices such as a commercial information monitor; security devices such as a surveillance monitor, and nursing care and medical devices such as a nursing monitor and a medical monitor.

Preferably, the application of the liquid crystal display of the invention is a television. The liquid crystal display is preferably used for a large television. A display size of the television is preferably wide 17-type (373 mm×224 mm) or more, more preferably wide 23-type (499 mm×300 mm) or more, particularly preferably wide 26-type (566 mm×339 mm) or more, and most preferably wide 32-type (687 mm×412 mm) or more.

EXAMPLES

The present invention is now illustrated in greater detail with reference to Examples and Comparative Rumples, but it should be understood that the present invention is not to be construed as being limited thereto. Analysis methods used in Examples are as described below.

(1) Method of Measuring Moisture content in Polarizer

Using a Karl Fischer moisture meter "MKA-610" [product name, Kyoto Electronics Manufacturing Co., Ltd.], a sample cut into a size of 10 mm×30 mm was placed in a heating furnace at 150±1° C. and measurement was carried out under bubbling of a titration cell solution with nitrogen gas (200 ml/minute).

(2) Method of Measuring Single transmittance and Degree of Polarization of Polarizer Using a spectrophotometer "DOT-3" (product name, manufactured by Murakami Color Research Laboratory), measurement was carried out at 23° C.

(3) Method of Measuring Molecular Weight

The molecular weight was calculated by a gel permeation chromatograph (GPC) method using polystyrene as a standard sample. Specifically, the molecular weight was measured under the following measurement conditions using the following apparatus and instruments.

Measurement sample: A sample resin was dissolved in tetrahydrofuran to prepare a 0.1 wt % solution which was left standing over night. Then, the solution was filtered through a 0.45 μm membrane filter to obtain a filtrate for measurement.

Analyzer: "HLC-8120GPC", manufactured by Tosoh Corporation

Column: TSKgel SuperHM-H4000/U3000/H2000

Column size: 6.0 mm I.D.×150 mm

Eluant: tetrahydrofuran

Flow rate: 0.6 ml/min

Detector: RI

Column temperature: 40° C.

Injection amount: 20 μl

(4) Method of Measuring Thickness

A thickness of less than 10 μm was measured using a spectrophotometer for thin film "Multichannel photodetector system (MCPD-2000)" (trade name, manufactured by Otsuka Electronics Co., Ltd.). A thickness of 10 μm or more was measured using a digital micrometer "KC-351C-type" (trade name) manufactured by Anritsu Corporation.

(5) Method of Measuring Average Refractive Index of Film

The average refractive index of the film was determined by measuring refractive indices using an Abbe refractometer "DR-M4" (trade name, manufactured by Atago Co., Ltd.) with light having a wavelength of 589 nm at 23° C.

(6) Method of Determining Retardation Values (Re[450], Re[550], Rth[550])

The retardation values were determined using an spectroscopic ellipsometer "M-220" (trade name, manufactured by JASCO Corporation) with light having a wavelength of 450 nm or 550 nm at 23° C.

(7) Method of Measuring Transmittance (T[550])

The transmittance was measured using a UV-visible spectrophotometer "V-560" (trade name, manufactured by JASCO Corporation) with light having a wavelength of 550 nm at 23° C.

(8) Method of Measuring Absolute Value of Photoelastic Coefficient (C[550])

The retardation values (23° C./wavelength of 550 nm) of the center part of a sample having a size of 2 cm×10 cm were determined under stress (5 to 15N) using a spectroscopic ellipsometer "M-220" (trade name, manufactured by JASCO Corporation) while both ends of the sample were fixed, and the photoelastic coefficient was calculated from a slope of a function of the stress and the retardation values.

(9) Method of Measuring Shrinkage Ratio of Shrinkable Film

The shrinkage ratio was determined in accordance with a heat shrinkage ratio A method of JIS Z1712-1997 (except that a heating temperature is changed from 120° C. to 140° C. (or 160° C.) and a load of 3 g is added to a sample piece). Specifically, five samples having a width of 20 mm and a length of 150-mm were sampled from a machine direction (MD) and a transverse direction (TD), respectively. The sample pieces were each marked at a distance of about 100 mm at a center. The sample pieces each with a load of 3 g were hung vertically in an air-circulating thermostatic bath maintained at 140° C.±3° C. (or 160° C.±3° C.). The sample pieces were heated for 15 min, taken out of the thermostatic bath, and left standing under standard conditions (room temperature) for 30 min. Then, the distances between the marks were measured using a caliper in accordance with JIS B7507, to thereby obtain an average of five measured values. A shrinkage ratio was calculated from an equation: S (%)=[(distance between marks (mm) before heating–distance between marks (mm) after heating)/distance between marks (mm) before heating]×100.

(10) Method of Measuring Shrinkage Stress of Shrinkable Film

A shrinkage stress in a transverse direction at 140° C. $T^{140}$[TD] and a shrinkage stress in a transverse direction at 150° C. $T^{150}$[TD] were measured by TMA method using the following apparatus.

Apparatus: "TMA/SS 6100" manufactured by Seiko Instruments Co., Ltd.

Data processing: "EXSTAR6000" manufactured by Seiko instruments Co., Ltd.

Measurement mode: measurement with temperature elevation at a constant rate (10° C./min)

Measurement atmosphere: in the air (23° C.)
Load: 20 mN
Sample size: 15 mm×2 mm (a long side is a transverse [TD] direction)

(1) Method of Measuring Luminance Spectrum of Lighting Device

After a light was turned on for 30 minutes in a room at 23° C., a central part of the light was measured using a spectrophotometer for thin film "Multichannel photodetector system (MCPD-2000)" (trade name, manufactured by Otsuka Electronics Co., Ltd.).

(12) Method of Determining Light Leak (Y) of Liquid Crystal Display

After a light was turned on for 30 minutes in a dark room at 23° C., a black image was displayed on the display of a liquid crystal display and a three-stimulation value Y defined in CIE1931XYZ display system was measured on the display in all azimuth directions (0 to 360°) at a polar angle of 60° using "EZ Contrast 160D" (trade name, manufactured by ELDIM). Along side direction of the liquid crystal panel was regarded as an azimuth direction of 0° and a normal line direction as a polar angle of 0°.

(13) Method of Determining Color Shift (Δa*b*) of Liquid Crystal Display

After a light was turned on for 30 minutes in a dark room at 23° C., a black image was displayed on the display of a liquid crystal display and color coordinates a* and b* defined in CME1976L*a*b* color space were measured on the display in all azimuth directions (0 to 360°) at a polar angle of 60° using "EZ Contrast 160D" (trade name, manufactured by ELDIM). The color shift (Δa*b*) in an oblique direction was calculated from the following expression: $\{(a^*)^2+(b^*)^2\}^{1/2}$.

Production of Polarizer

Reference Example 1

A polymer film "9P75R" (trade name, thickness of 75 μm, average degree of polymerization of 2,400, degree of saponification of 99.9 mol %, manufactured by Kuraray Co., Ltd.) containing polyvinyl alcohol as a main component was uniaxially stretched 2.5 times using a roll stretching machine while the polymer film was colored in a coloring bath maintained at 30±3° C. and containing iodine and potassium iodide. Then, the polymer film was uniaxially stretched to a 6 times length of the original length of the polymer film in an aqueous solution maintained at 60±3° C. and containing boric acid and potassium iodide while a crosslinking reaction was performed. The obtained film was dried in an air circulating thermostatic oven at 50±1° C. for 30 min, to thereby obtain polarizers P1 and P2. Optical characteristics of the polarizers P1 and P2 are as shown in Table 1.

TABLE 1

|  | Reference Example |
| --- | --- |
| Polarizer | P1, P2 |
| Moisture content (%) | 26 |
| Thickness (μm) | 28 |
| Single transmittance (%) | 44.1 |
| Parallel transmittance (%) | 39.0 |

TABLE 1-continued

|  | Reference Example |
|---|---|
| Perpendicular transmittance (%) | 0.02 |
| Degree of polarization (%) | 99.95 |
| Hue a value | −1.4 |
| Hue b value | 3.4 |

Production of First Optical Element

Reference Example 2

A shrinkable film A having a thickness of 60 μm (a biaxially stretched film containing polypropylene "TORAYFAN BO2874" (trade name, manufactured by Toray Industries, Inc.) was attached to each side of a polymer film having a thickness of 100 μm containing a resin obtained through hydrogenation of a ring-opened polymer of a norbornene-based monomer (norbornene-based resin) "ZEONOR ZF14-100" (trade name, average refractive index of 1.53, Tg of 136° C., Re[550] of 3.0 nm, Rth[550] of 5.0 nm, manufactured by Optes Inc.) through an acrylic pressure sensitive adhesive layer (thickness of 15 μm). Then, the resultant was stretched 1.38 times in an air-circulating thermostatic oven at 146° C. using a roll stretching machine while a machine direction of the film was held, and thereafter, the shrinkable film A was peeled off together with the acrylic pressure sensitive adhesive layer, to thereby produce a retardation film. The retardation film is referred to as retardation film 1-A, whose characteristics are shown in Table 2. The retardation film showed that optical indicatrix has a relationship of nx>nz>ny. Physical properties of the shrinkable film A are shown in Table 3.

Reference Example 3

The shrinkable film A having a thickness of 60 μm was attached to each side of a polymer film having a thickness of 130 μm containing a resin obtained through hydrogenation of a ring-opened polymer of a norbornene-based monomer (norbornene-based resin) "ARTON FLZU 130D0" (trade name, weight average molecular weight of 78,200, average refractive index of 1.52, Tg of 135° C., Re[550] of 3.0 nm, Rth[550] of 5.0 nm, manufactured by JSR corporation) through an acrylic pressure sensitive adhesive layer (thickness of 15 μm). Then, the resultant was stretched 1.42 times in an air-circulating thermostatic oven at 146° C. using a roll stretching machine while a machine direction of the film was held, and thereafter, the shrinkable film A was peeled off together with the acrylic pressure sensitive adhesive layer, to thereby produce a retardation film. The retardation film is referred to as retardation film 1-B, whose characteristics are shown in Table 2. The retardation film showed that optical indicatrix has a relationship of nx>nz>ny. Physical properties of the shrinkable film A are shown in Table 3.

Reference Example 4

A shrinkable film B having a thickness of 60 μm (a biaxially stretched film containing polypropylene "TORAYFAN BO2570A" (trade name, manufactured by Toray Industries, Inc.) was attached to each side of a polymer film having a thickness of 55 μm containing a polycarbonate-based resin "ELMECH" (trade name, weight average molecular weight of 60,000, average refractive index of 1.53, Tg of 136° C., Re[550] of 1.0 nm, Rth[550] of 3.0 nm, manufactured by Kaneka Corporation) through an acrylic pressure sensitive adhesive layer (thickness of 15 μm). Then, the resultant was stretched 1.29 times in an air-circulating thermostatic oven at 147° C. using a roll stretching machine while a machine direction of the film was held, and thereafter, the shrinkable film B was peeled off together with the acrylic pressure sensitive adhesive layer, to thereby produce a retardation film. The retardation film is referred to as retardation film 1-C, whose characteristics are shown in Table 2. The retardation film showed that optical indicatrix has a relationship of nx>nz>ny. Physical properties of the shrinkable film B are shown in Table 3.

TABLE 2

|  | Reference Example 2 | Reference Example 3 | Reference Example 4 |
|---|---|---|---|
| Retardation film | 1-A | 1-B | 1-C |
| Optical indicatrix | nx > nz > ny | nx > nz > ny | nx > nz > ny |
| Thickness (μm) | 108 | 147 | 59 |
| Transmittance (%) | 91 | 91 | 91 |
| Re[550] (nm) | 270.0 | 194.0 | 280.0 |
| Rth[550] (nm) | 135.0 | 69.8 | 140.0 |
| Orientation angle (°) | ±0.7 | ±0.7 | ±0.7 |
| Re[450]/Re[550] | 1.00 | 1.00 | 1.08 |
| Rth[550]/Re[550] | 0.50 | 0.36 | 0.50 |
| C[550] × $10^{-12}$ (m$^2$/N) | 3.1 | 5.2 | 50.0 |

TABLE 3

| Shrinkable film |  | A | B |
|---|---|---|---|
| Shrinkage ratio at 140° C. (machine direction) | $S^{140}$(MD)(%) | 6.4 | 5.7 |
| Shrinkage ratio at 140° C. (transverse direction) | $S^{140}$(TD)(%) | 12.8 | 7.6 |
| Difference in shrinkage at 140° C. (transverse direction-machine direction) | $\Delta S^{140}$(%) | 6.4 | 1.9 |
| Shrinkage ratio at 160° C. (machine direction) | $S^{160}$(MD)(%) | 19.6 | 18.0 |
| Shrinkage ratio at 160° C. (transverse direction) | $S^{160}$(TD)(%) | 45.5 | 35.7 |
| Difference in shrinkage at 160° C. (transverse direction-machine direction) | $\Delta S^{160}$(%) | 25.9 | 17.7 |
| Shrinkage stress at 140° C. in transverse direction | $T^{140}$(TD)(N/2 mm) | 0.65 | 0.45 |
| Shrinkage stress at 150° C. in transverse direction | $T^{150}$(TD)(N/2 mm) | 0.75 | 0.56 |

Production of Second Optical Element

Reference Example 5

A commercially available polymer film "UZ-TAC" (trade name, thickness of 40 μm, average refractive index of 1.48, manufactured by Fuji Photo Film Co., Ltd.) containing triacetyl cellulose as a main component was used as it was. The polymer film was referred to as a retardation film 2-A, whose characteristics are shown in Table 2. The retardation film showed that optical indicatrix has a relationship of nx=ny>nz.

TABLE 4

|  | Reference Example 5 |
| --- | --- |
| Retardation film | 2-A |
| Thickness (μm) | 40 |
| Transmittance (%) | 92 |
| Re[550] (nm) | 2.2 |
| Rth[550] (nm) | 39.8 |
| C[550] × $10^{-12}$ (m$^2$/N) | 17.8 |

Production of Liquid Crystal Cell

Reference Example 6

A liquid crystal panel was taken out of a commercially available liquid crystal display "FACE (model No. 32LC100)" (trade name, a 32V-type wide liquid crystal television manufactured by Toshiba Corporation, display size: 697 mm×392 mm) including a liquid crystal cell of EPS mode. Optical films arranged above and below the liquid crystal cell were removed, and glass surfaces (front and back surfaces) of the liquid crystal cell were washed. The liquid crystal cell thus prepared was referred to as a liquid crystal cell A.

Production of Lighting Device

Reference Example 7

A commercially available backlight "LIGHT-BOX 35H for professional use" (trade name, manufactured by ARGO Corporation) was used as it was. The backlight was referred to as a lighting device A. The lighting device A bad a maximum value of luminance at a wavelength of 545 nm and a relative luminance of 0.135 at a wavelength of 450 nm.

Reference Example 8

A backlight mounted on a commercially available liquid crystal display "FACE (model No. 32LC100)" (trade name, a 32V-type wide liquid crystal television manufactured by Toshiba Corporation) was used as it was. The backlight was referred to as a lighting device B. The lighting device B had a maximum value of luminance at a wavelength of 545 nm and a relative luminance of 0.319 at a wavelength of 450 nm.

Reference Example 9

A backlight mounted on a commercially available liquid crystal display "Wooo (model No. W32-L7000)" (trade name, a 32V-type wide liquid crystal television manufactured by Hitachi Ltd.) was used as it was. The backlight was referred to as a lighting device C. The lighting device C had a maximum value of luminance at a wavelength of 545 nm and a relative luminance of 0.324 at a wavelength of 450 nm.

Figure 7:
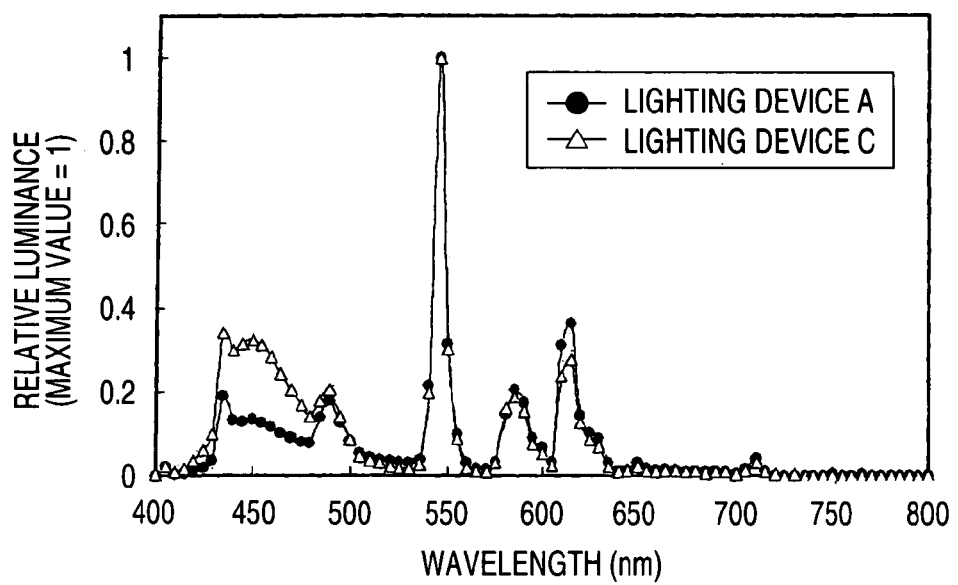
FIG. 7 is a luminance spectrum of the lighting device A and C obtained in Reference Examples 7 and 9, respectively.

FIG. 7 is a luminance spectrum of the lighting device A and C obtained in Reference Examples 7 and 9, respectively. The lighting device A has a maximum value of relative luminance of 0.19 in the wavelength range of 450±50 nm and a maximum value of relative luminance of 0.28 in the wavelength range of 650±50 nm. The lighting device C has a maximum value of relative luminance of 0.34 in the wavelength range of 450±50 nm and a maximum value of relative luminance of 0.36 in the wavelength range of 650±50 nm.

Production of Liquid Crystal Panel and Liquid Crystal Display

Example 1

The retardation film 1-A obtained in Reference Example 2 as a first optical element was attached on a surface of a viewer side of the liquid crystal cell A obtained in Reference Example 6 through an acrylic pressure sensitive adhesive layer (thickness of 23 μm) such that the slow axis thereof and a longitudinal direction of the liquid crystal cell A were substantially perpendicular (90°±0.5°) to each other. Then, the polarizing plate A comprising protective layers on both sides of the polarizer P1 obtained in Reference Example 1 as a first polarizer was attached on the surface of the retardation film 1-A through an acrylic pressure sensitive adhesive layer (thickness of 23 μm) such that the absorption axis of the polarizer P1 and a longitudinal direction of the liquid crystal cell A were substantially parallel (0°±0.5°) to each other. In this case, the initial orientation direction of the liquid crystal cell A and the absorption axis direction of the first polarizer (polarizer P1) are substantially perpendicular to each other. Moreover, the absorption axis direction of the first polarizer (polarizer P1) and the slow axis direction of the first optical element (retardation film 1-A) are substantially perpendicular to each other. The protective layer "ZRF80S" (trade name, average refractive index of 1.48, thickness of 80 μm, Re[550] of 1.0 nm, Rth[550] of 3.1 nm, manufactured by Fuji Photo Film Co., Ltd.) arranged on both sides of the polarizer P1 has substantially isotropy.

Then, the polarizing plate B comprising protective layers on both sides of the polarizer P2 obtained in Reference Example 1 as a second polarizer was attached on the surface opposite to the viewer side of the liquid crystal cell A through an acrylic pressure sensitive adhesive layer (thickness of 23 μm) such that the absorption axis of the polarizer P2 and a longitudinal direction of the liquid crystal cell A were substantially perpendicular (90°±0.5°) to each other. In this case, the initial orientation direction of the liquid crystal cell A and the absorption axis direction of the second polarizer (polarizer P2) are substantially parallel to each other. Moreover, the absorption axis direction of the first polarizer (polarizer P1) and the absorption axis direction of the second polarizer (polarizer P2) are substantially perpendicular to each other. The protective layer arranged on both sides of the polarizer P2, which was the same as one used for the polarizer A, has substantially isotropy.

Figure 8:
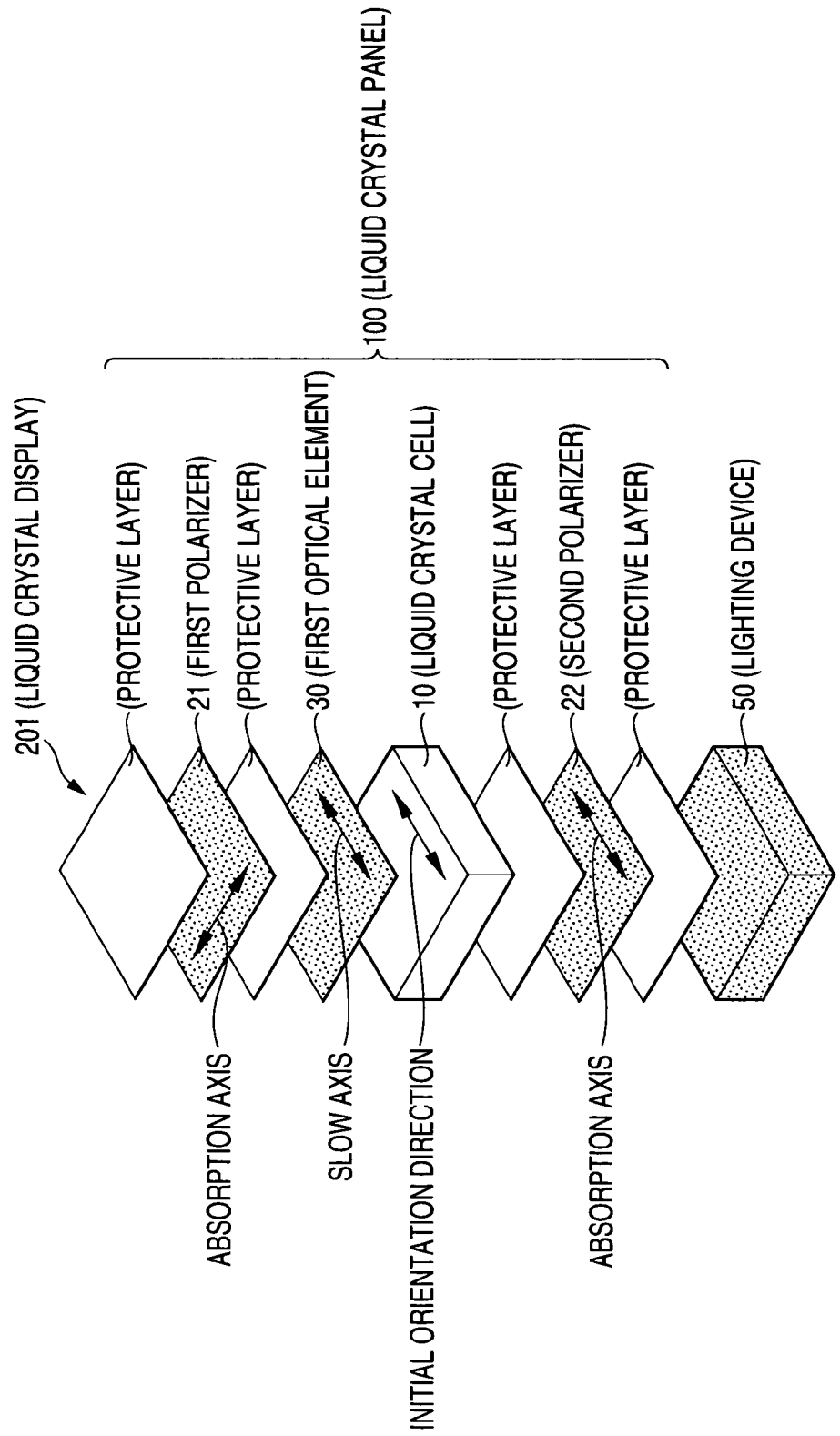
FIG. 8 is a schematic perspective view of a liquid crystal display used in Examples 1 and 3 and Comparative Examples 1, 2, 5 and 6.

The thus-obtained liquid crystal panel A was connected to a lighting device A obtained in Reference Example 7, to thereby produce a liquid crystal display A having a constitution shown in FIG. 8. The liquid crystal display A had favorable display uniformity across the entire surface just after backlight was turned on. After backlight was turned on for 30 minutes, light leak (Y) in an oblique direction and color shift (Δa*b*) in an oblique direction were measured. The following Table 5 shows the obtained properties of the liquid crystal display A together with the properties obtained in the following Examples 2 and 3 and Comparative Examples 1 to 6.

TABLE 5

Figure 9:
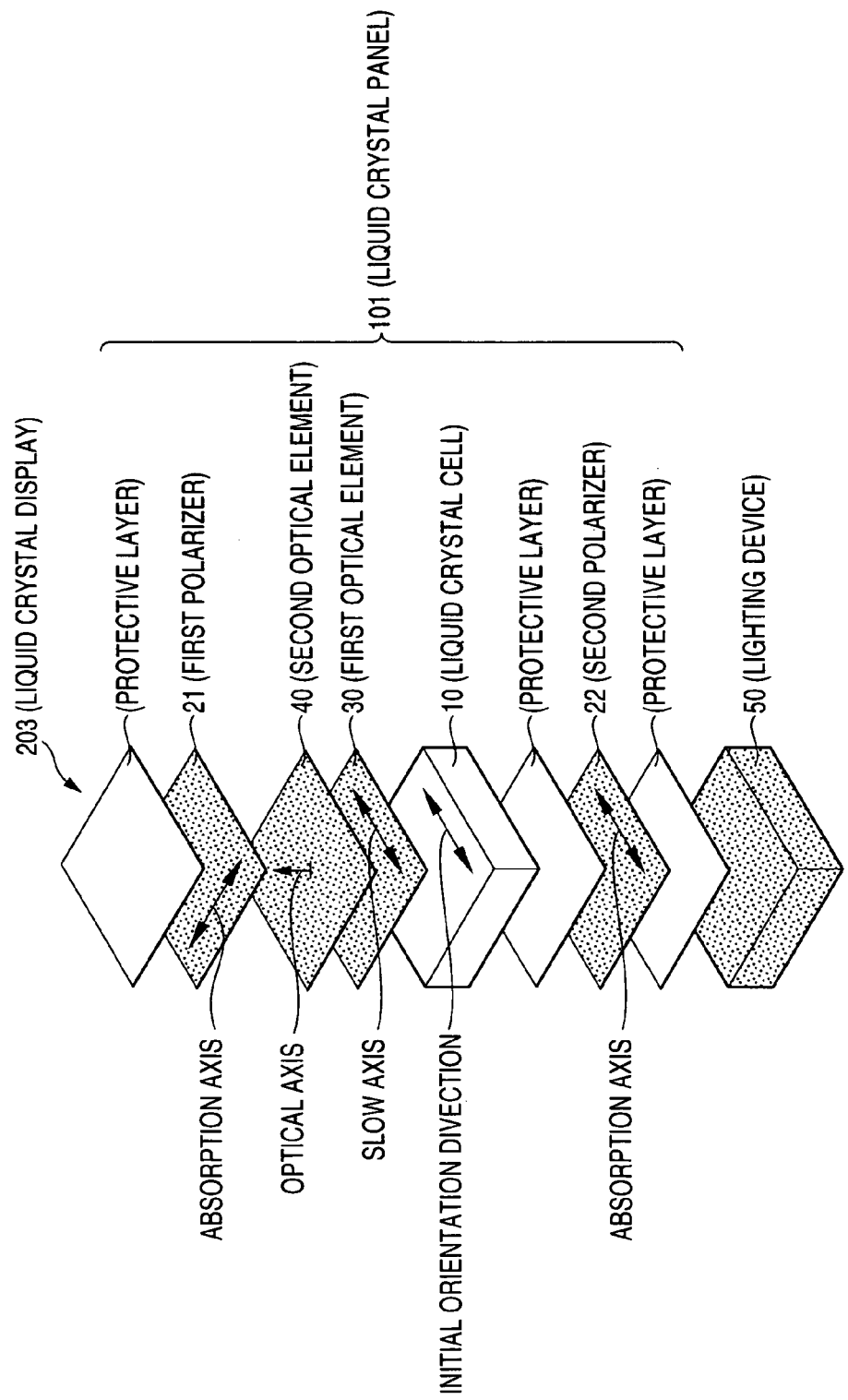
FIG. 9 is a schematic perspective view of a liquid crystal display used in Example 2 and Comparative Examples 3 and 4.

| | First optical element | | Second optical element | Lighting device | | Liquid crystal display | | | | | |
|---|---|---|---|---|---|---|---|---|---|---|---|
| | | | | Wavelength at maximum luminance (nm) | Relative luminance at wavelength of 450 nm | | | Δa*b* [polar angle 60°] | | Y [polar angle 60°] | |
| | Retardation film | Wavelength dispersion value (D) | Retardation film | | | Constitution | | Maximum value | Average value | Maximum value | Average value |
| Example 1 | 1-A | 1.00 | not used | 545 | 0.135 | A | FIG. 8 | 3.1 | 1.3 | 0.28 | 0.14 |
| Comparative Example 1 | 1-A | 1.00 | not used | 545 | 0.319 | L | FIG. 8 | 13.2 | 7.2 | 0.51 | 0.36 |
| Comparative Example 2 | 1-A | 1.00 | not used | 545 | 0.324 | M | FIG. 8 | 17.4 | 10.0 | 0.87 | 0.50 |
| Example 2 | 1-B | 1.00 | 2-A | 545 | 0.135 | B | FIG. 9 | 6.6 | 2.8 | 1.01 | 0.46 |
| Comparative Example 3 | 1-B | 1.00 | 2-A | 545 | 0.319 | N | FIG. 9 | 19.4 | 10.3 | 1.10 | 0.58 |
| Comparative Example 4 | 1-B | 1.00 | 2-A | 545 | 0.324 | O | FIG. 9 | 22.5 | 13.2 | 1.44 | 0.72 |
| Example 3 | 1-C | 1.08 | not used | 545 | 0.135 | C | FIG. 8 | 10.5 | 4.3 | 0.53 | 0.31 |
| Comparative Example 5 | 1-C | 1.08 | not used | 545 | 0.319 | P | FIG. 8 | 16.9 | 10.4 | 0.51 | 0.36 |
| Comparative Example 6 | 1-C | 1.08 | not used | 545 | 0.324 | Q | FIG. 8 | 22.0 | 13.7 | 0.81 | 0.49 |

Comparative Example 1

A liquid crystal display L was produced in the same manner as in Example 1 except that the lighting device B obtained in Reference Example 8 was used as the lighting device. The liquid crystal display L thus produced has a constitution shown in FIG. 8. Properties of the liquid crystal display L are as shown in Table 5.

Comparative Example 2

A liquid crystal display M was produced in the same manner as in Example 1 except that the lighting device C obtained in Reference Example 9 was used as the lighting device. The liquid crystal display M thus produced has a constitution shown in FIG. 8. Properties of the liquid crystal display M are as shown in Table 5.

Example 2

A liquid crystal display B was produced in the same manner as in Example 1 except that the polarizing plate B obtained using the second optical element obtained in reference example 6 (retardation film 2-A) was used as the protective layer for a side of the polarizer P1 on which the first optical element (retardation film 1-A) was provided (between the first polarizer and the first optical element) and the retardation film 1-B obtained in Reference Example 3 was used as the first optical element. The liquid crystal display B thus produced has a constitution shown in FIG. 9. Properties of the liquid crystal display B are as shown in Table 5.

Comparative Example 3

A liquid crystal display N was produced in the same manner as in Example 2 except that the lighting device B obtained in Reference Example 8 was used as the lighting device. The liquid crystal display N thus produced has a constitution shown in FIG. 9. Properties of the liquid crystal display N are as shown in Table 5.

Comparative Example 4

A liquid crystal display O was produced in the same manner as in Example 2 except that the lighting device C obtained in Reference Example 9 was used as the lighting device. The liquid crystal display O thus produced has a constitution shown in FIG. 9. Properties of the liquid crystal display O are as shown in Table 5.

Example 3

A liquid crystal display C was produced in the same manner as in Example 1 except that the retardation film 1-C obtained in Reference Example 4 was used as the first optical element. The liquid crystal display C thus produced has a constitution shown in FIG. 8. Properties of the liquid crystal display C are as shown in Table 5.

Comparative Example 5

A liquid crystal display P was produced in the same manner as in Example 3 except that the lighting device B obtained in Reference Example 8 was used as the lighting device. The liquid crystal display P thus produced has a constitution shown in FIG. 8. Properties of the liquid crystal display P are as shown in Table 5.

Comparative Example 6

A liquid crystal display Q was produced in the same manner as in Example 3 except that the lighting device C obtained in Reference Example 9 was used as the lighting device. The liquid crystal display Q thus produced has a constitution shown in FIG. 8. Properties of the liquid crystal display Q are as shown in Table 5.

Evaluation

Figure 10:
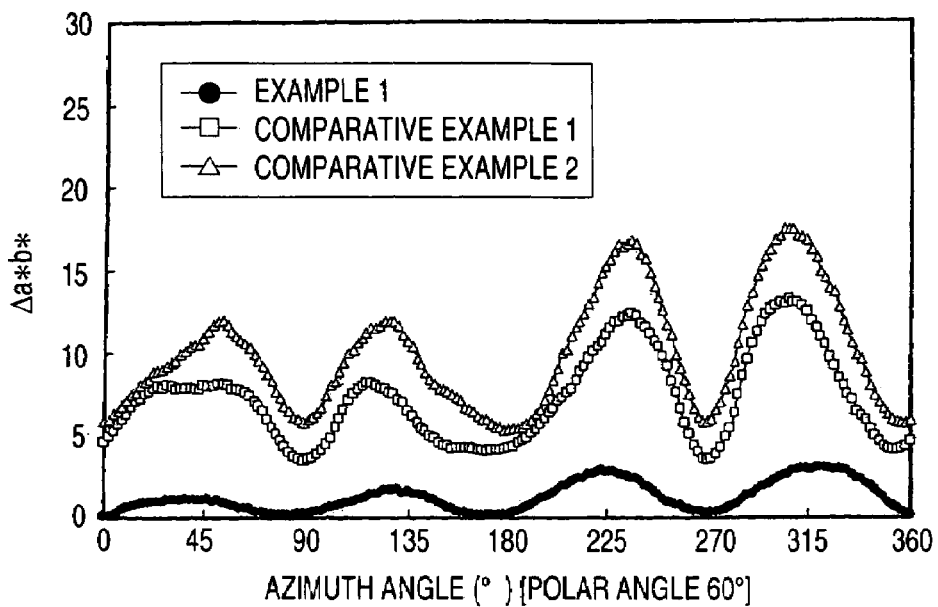
FIG. 10 is a graph showing results of measurement of Δa*b* values in all azimuth directions (0 to 360°) at a polar angle of 60° in Example 1 and Comparative Examples 1 and 2.

FIG. 10 is a graph showing results of measurement of Δa*b* values in all azimuth directions (0 to 360°) at a polar angle of 60° in Example 1 and Comparative Examples 1 and 2. The Δa*b* value is one index showing color shift of a liquid crystal display. The smaller the value thereof is, the more excellent the display properties are. The liquid crystal display A obtained in Example 1 had an extraordinarily small maximum value of Δa*b* in an oblique direction as compared with the liquid crystal displays L and M obtained in Comparative Examples 1 and 2.

Figure 11:
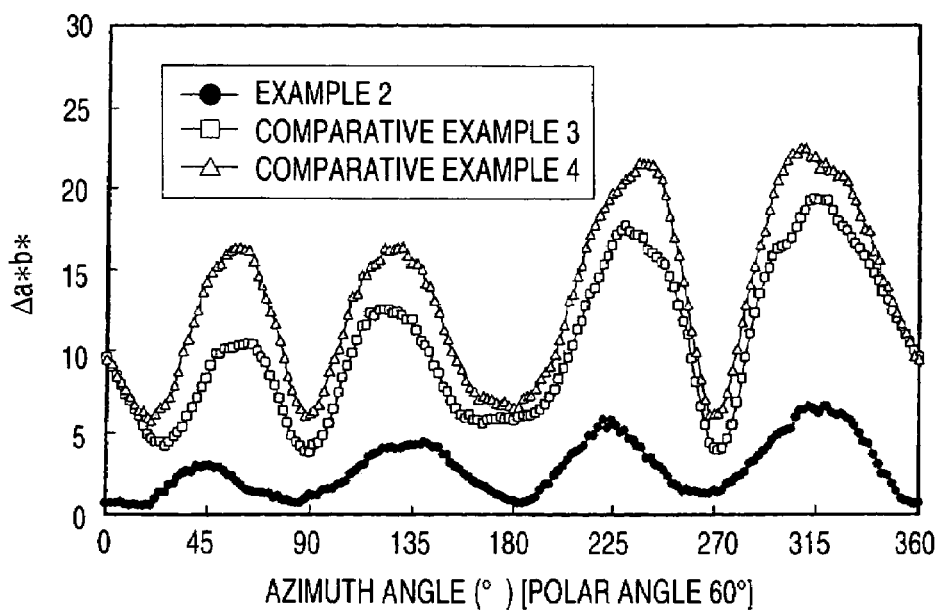
FIG. 11 is a graph showing results of measurement of Δa*b* values in all azimuth directions (0 to 360°) at a polar angle of 60° in Example 2 and Comparative Examples 3 and 4.

FIG. 11 is a graph showing results of measurement of Δa*b* values in all azimuth directions (0 to 360°) at a polar angle of 60° in Example 2 and Comparative Examples 3 and 4. The liquid crystal display B obtained in Example 2 had an extraordinarily small maximum value of Δa*b* in an oblique direction as compared with the liquid crystal displays N and O obtained in Comparative Examples 3 and 4.

Figure 12:
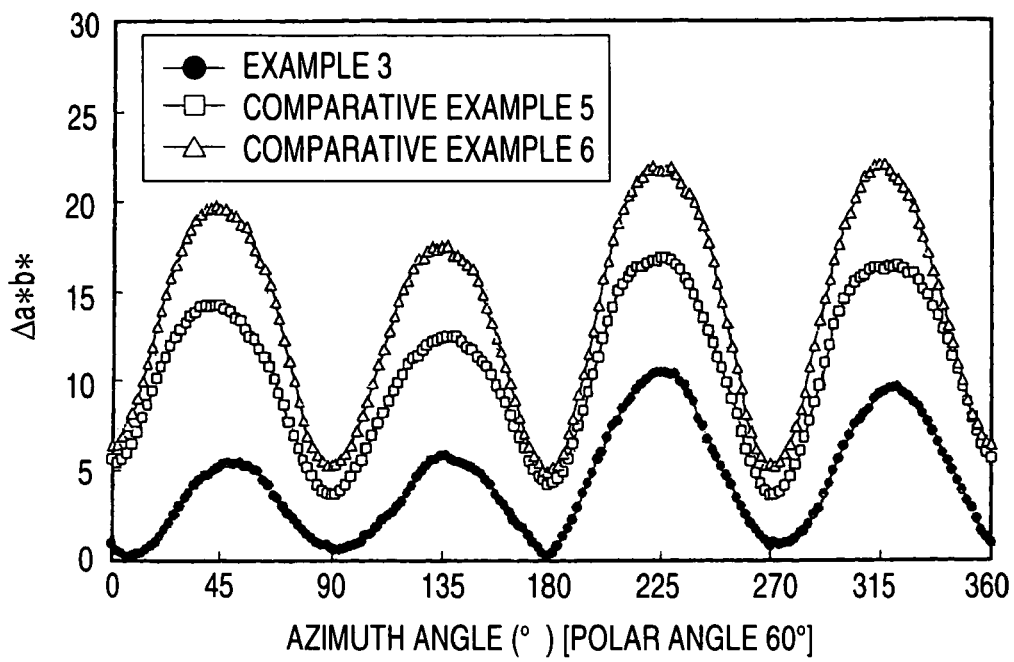
FIG. 12 is a graph showing results of measurement of Δa*b* values in all azimuth directions (0 to 360°) at a polar angle of 60° in Example 3 and Comparative Examples 5 and 6.

FIG. 12 is a graph showing results of measurement of Δa*b* values in all azimuth directions (0 to 360°) at a polar angle of 60° in Example 3 and Comparative Examples 5 and 6. The liquid crystal display C obtained in Example 2 had an extraordinarily small maximum value of Δa*b* in an oblique direction as compared with the liquid crystal displays P and Q obtained in Comparative Examples 5 and 6.

Figure 13:
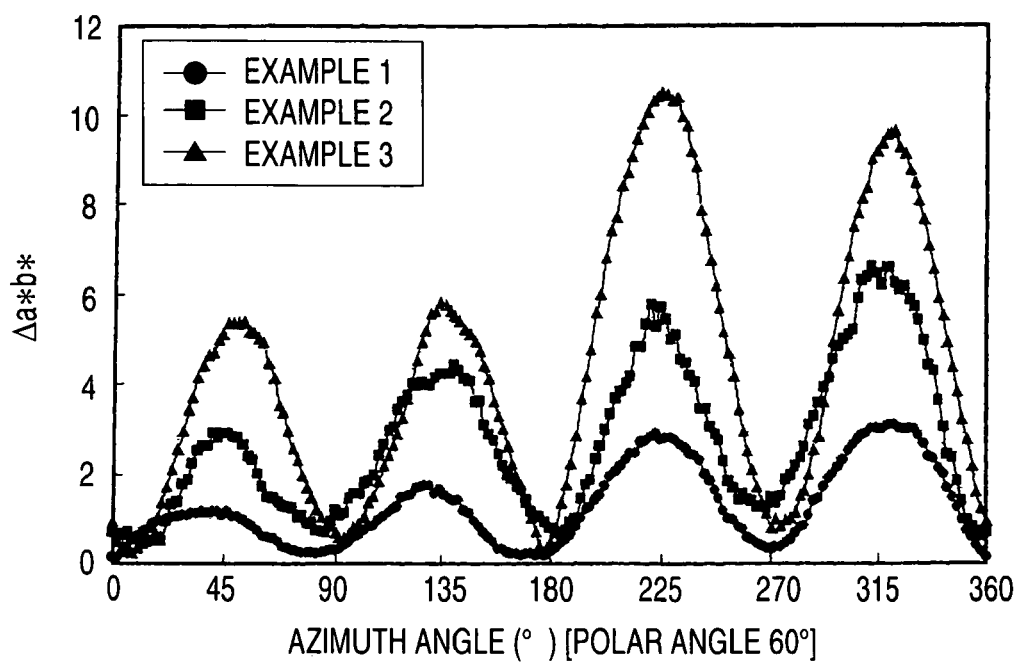
FIG. 13 is a graph showing results of measurement of Δa*b* values in all azimuth directions (0 to 360°) at a polar angle of 60° in Examples 1 to 3.

FIG. 13 is a graph showing results of measurement of Δa*b* values in all azimuth direction (0 to 360°) at a polar angle of 60° in Examples 1 to 3. Among the liquid crystal displays A to C obtained in Examples 1 to 3, respectively, the liquid crystal display A had the smallest Δa*b* value in an oblique direction.

Figure 14:
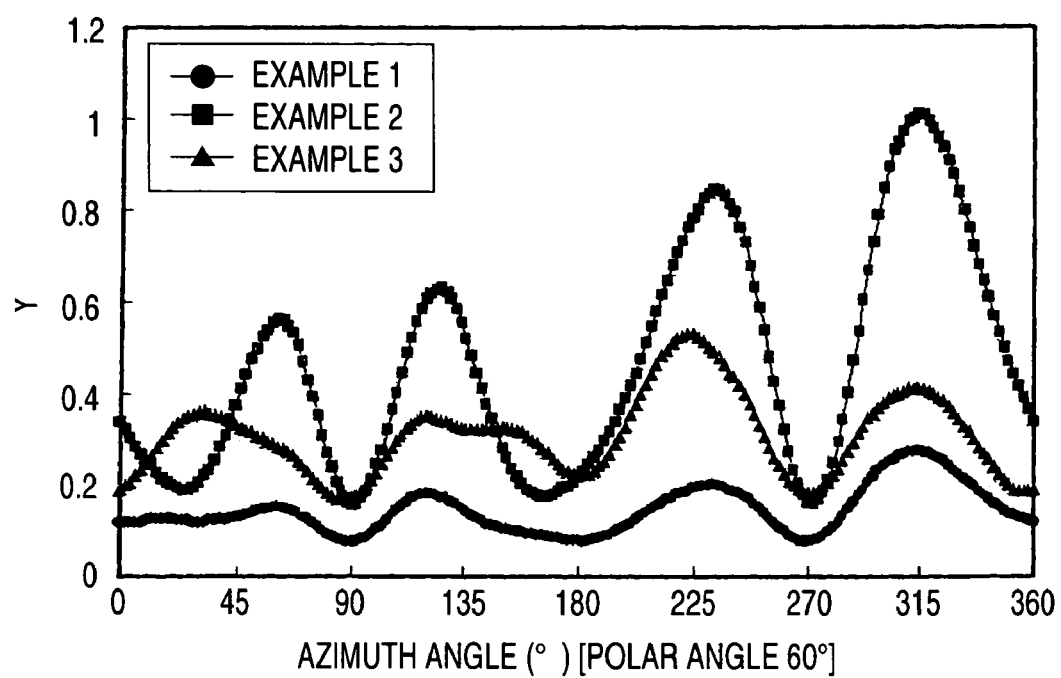
FIG. 14 is a graph showing results of measurement of Y values in all azimuth directions (0 to 360°) at a polar angle of 60° in Examples 1 to 3.

FIG. 14 is a graph showing results of measurement of Y values in all azimuth directions (0 to 360°) at a polar angle of 60° in Examples 1 to 3. The Y value is one index showing light leak of a liquid crystal display. The smaller the value thereof is, the more excellent the display properties are. Among the liquid crystal displays A to C obtained in Examples 1 to 3, respectively, the liquid crystal display A had the smallest Y value in an oblique direction.

As shown in Examples 1 to 3 and Table 5 and FIG. 10 to 14, a liquid crystal display comprising a liquid crystal panel wherein an optical element whose optical indicatrix has a relationship of $nx \geqq nz > ny$ is arranged in a specific positional relationship and a lighting device having a specific relative luminance exhibited excellent display properties of a small color shift in an oblique direction and a small light leak in an oblique direction. On the other hand, as shown in Comparative Examples 1 to 6 and Table 5 and FIG. 10 to 14, a liquid crystal display wherein the relative luminance of the lighting device does not satisfy the range of the invention exhibited a large color shift in an oblique direction.

While the present invention has been described in detail and with reference to specific embodiments thereof it will be apparent to one skilled in the art that various changes and modifications can be made therein without departing from the spirit and scope thereof.

The present application is based on Japanese Patent Application No. 2005-340663 filed on Nov. 25, 2005, and the contents thereof are incorporated herein by reference.

What is claimed is:

1. A liquid crystal display comprising:
   liquid crystal panel; and
   a lighting device disposed on one side of the liquid crystal panel,
      the liquid crystal panel comprising:
         a liquid crystal cell;
         a first polarizer disposed on one side of the liquid crystal cell;
         a second polarizer disposed on the other side of the liquid crystal cell; and
         a first optical element disposed between the liquid crystal cell and the first polarizer;
      the absorption axis direction of the first polarizer being substantially perpendicular to the absorption axis direction of the second polarizer,
      the first optical element having an optical indicatrix having a relationship of $nx \geqq nz > ny$,
      the lighting device having:
         a maximum value of luminance in the wavelength range of 550±50 nm; and
         a relative luminance in the wavelength range of 450±50 nm is 0.28 or less.

2. The liquid crystal display according to claim 1, wherein the liquid crystal cell comprises a liquid crystal layer containing homogeneously oriented liquid crystal molecules in the absence of an electric field.

3. The liquid crystal display according to claim 2, wherein the liquid crystal molecules have a pre-tilt angle of 10° or less.

4. The liquid crystal display according to claim 1, wherein the initial orientation direction of the liquid crystal cell is substantially parallel to the absorption axis direction of the second polarizer.

5. The liquid crystal display according to claim 1, wherein the slow axis direction of the first optical element is substantially perpendicular to the absorption axis of the first polarizer.

6. The liquid crystal display according to claim 1, wherein the first optical element has a Re[550] of 100 to 300 nm.

7. The liquid crystal display according to claim 1, wherein the first optical element has a wavelength dispersion value (D) of 0.90 to 1.10.

8. The liquid crystal display according to claim 1, wherein the first optical element has an Nz coefficient of −0.2 to 0.8.

9. The liquid crystal display according to claim 1, wherein the first optical element comprises a retardation film containing a norbornene-based resin.

10. The liquid crystal display according to claim 1, wherein
    the liquid crystal panel further comprises a second optical element between the first polarizer and the first optical element, and
    the second optical element has an optical indicatrix having a relationship of $nx=ny>nz$.

11. The liquid crystal display according to claim 10, wherein the second optical element comprises a retardation film containing a cellulose-based resin.

12. The liquid crystal display according to claim 1, wherein the lighting device comprises: a light source; a reflection film; a diffusion plate; and a prism sheet.

13. The liquid crystal display according to claim 1, wherein the lighting device has a maximum value of relative luminance in the wavelength range of 450±50 nm of 0.05 to 0.28.

14. The liquid crystal display according to claim 1, wherein the lighting device is disposed on a side opposite to the viewer side of the liquid crystal cell.

15. The liquid crystal display according to claim 12, wherein the light source is at least one selected from the group consisting of a cold-cathode fluorescent tube, a light emitting diode, an organic EL, and a field emission-type element.

16. The liquid crystal display according to claim 1, wherein a maximum value of Δa*b* in all azimuth directions (0° to 360°) at a polar angle of 60 ° upon displaying a black image is 12 or less.

17. The liquid crystal display according to claim 1, where an average value of Δa*b* in all azimuth directions (0° to 360°) at a polar angle of 60 ° upon displaying a black image is 7 or less.

* * * * *